US011460068B2

(12) United States Patent
Kuroda

(10) Patent No.: US 11,460,068 B2
(45) Date of Patent: Oct. 4, 2022

(54) BALL JOINT, STABILIZER LINK, AND BALL JOINT MANUFACTURING METHOD

(71) Applicant: NHK SPRING CO., LTD., Kanagawa (JP)

(72) Inventor: Shigeru Kuroda, Kanagawa (JP)

(73) Assignee: NHK SPRING CO., LTD., Kanagawa (JP)

( * ) Notice: Subject to any disclaimer, the term of this patent is extended or adjusted under 35 U.S.C. 154(b) by 1 day.

(21) Appl. No.: 17/263,262

(22) PCT Filed: May 31, 2019

(86) PCT No.: PCT/JP2019/021705
§ 371 (c)(1),
(2) Date: Jan. 26, 2021

(87) PCT Pub. No.: WO2020/021856
PCT Pub. Date: Jan. 30, 2020

(65) Prior Publication Data
US 2021/0190134 A1    Jun. 24, 2021

(30) Foreign Application Priority Data

Jul. 27, 2018   (JP) .............................. JP2018-141816

(51) Int. Cl.
*F16C 11/06*          (2006.01)
(52) U.S. Cl.
CPC ................................ *F16C 11/0623* (2013.01)
(58) Field of Classification Search
CPC ... F16C 11/06; F16C 11/0619; F16C 11/0623; F16C 11/0628; F16C 11/0633; F16C 11/0638
See application file for complete search history.

(56) References Cited

U.S. PATENT DOCUMENTS 3,554,586 A * 1/1971 Cutler ................. F16C 11/0638
                                                        403/140
3,787,127 A * 1/1974 Cutler ................. F16C 11/0638
                                                        403/140

(Continued)

FOREIGN PATENT DOCUMENTS

JP          51-57364           5/1976
JP          58-189813         12/1983

(Continued)

OTHER PUBLICATIONS

Machine Translation of JP 2003247525A, translationportal.epo.org, created Apr. 12, 2022 (Year: 2022).*
Extended European Search Report received in EP Application No. 19840162.2, dated Mar. 21, 2022.
International Search Report issued in International Patent Application No. PCT/JP2019/021705, dated Aug. 27, 2019.

(Continued)

*Primary Examiner* — Daniel J Wiley
(74) *Attorney, Agent, or Firm* — Greenblum & Bernstein, P.L.C.

(57) ABSTRACT

An axial ball joint is provided with: a ball stud including a stud section and a ball section; a metallic housing which rotatably supports the ball section of the ball stud; and a resin-made ball seat which is provided to be interposed between the ball section and the housing. The housing is formed into a bottomed cylinder shape by pressing. The thickness of a bottom wall and the thickness of a circumferential side wall of the housing are set to be equal to each other. A plurality of bead sections are formed on the inner bottom of the housing by press-molding or forging.

9 Claims, 13 Drawing Sheets

(56) References Cited

U.S. PATENT DOCUMENTS

| | | | | |
|---|---|---|---|---|
| 3,967,907 | A | * | 7/1976 | Schmidt .............. F16C 11/0638 403/140 |
| 4,297,047 | A | * | 10/1981 | Farrant .............. F16C 11/0638 403/138 |
| 4,372,621 | A | * | 2/1983 | Farrant ................ F16C 11/086 384/2 |
| 4,564,307 | A | * | 1/1986 | Ito ....................... F16C 11/0638 403/140 |
| 4,750,885 | A | * | 6/1988 | Ito ....................... F16C 11/0638 403/135 |
| 5,368,408 | A | * | 11/1994 | Shimizu .............. F16C 11/0638 403/136 |
| 6,042,293 | A | * | 3/2000 | Maughan ............. F16C 11/068 403/135 |
| 8,678,656 | B2 | * | 3/2014 | Richter ................ F16C 11/068 403/135 |
| 2005/0111908 | A1 | * | 5/2005 | Green ................... B62D 7/166 403/135 |
| 2006/0269356 | A1 | * | 11/2006 | Jordan ................ F16C 11/0633 403/122 |
| 2015/0001824 | A1 | | 1/2015 | Kuroda |
| 2016/0003290 | A1 | * | 1/2016 | Trotter ..................... F16C 7/06 403/56 |

FOREIGN PATENT DOCUMENTS

| | | |
|---|---|---|
| JP | 60-85880 | 6/1985 |
| JP | 61-127785 | 8/1986 |
| JP | 63-42919 | 3/1988 |
| JP | 2002-103941 | 4/2002 |
| JP | 2003-247525 | 9/2003 |
| JP | 2010-101416 | 5/2010 |
| JP | 2010-112417 | 5/2010 |
| JP | 2013-151969 | 8/2013 |
| JP | 2013-167314 | 8/2013 |
| WO | 2006/019145 | 2/2006 |

OTHER PUBLICATIONS

Written Opinion issued in International Patent Application No. PCT/JP2019/021705, dated Aug. 27, 2019.

* cited by examiner

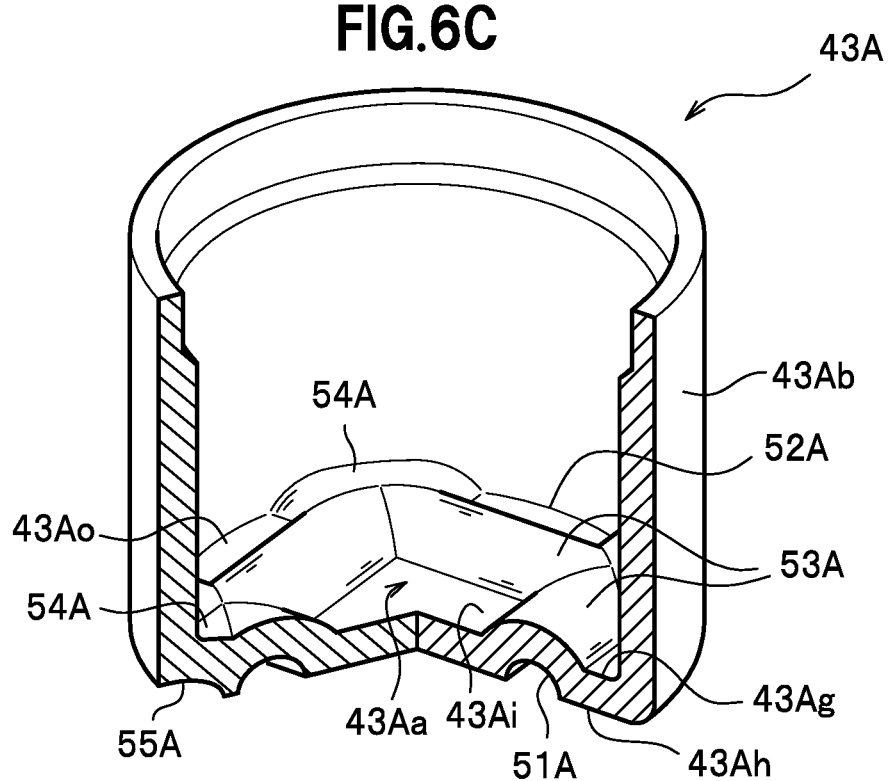
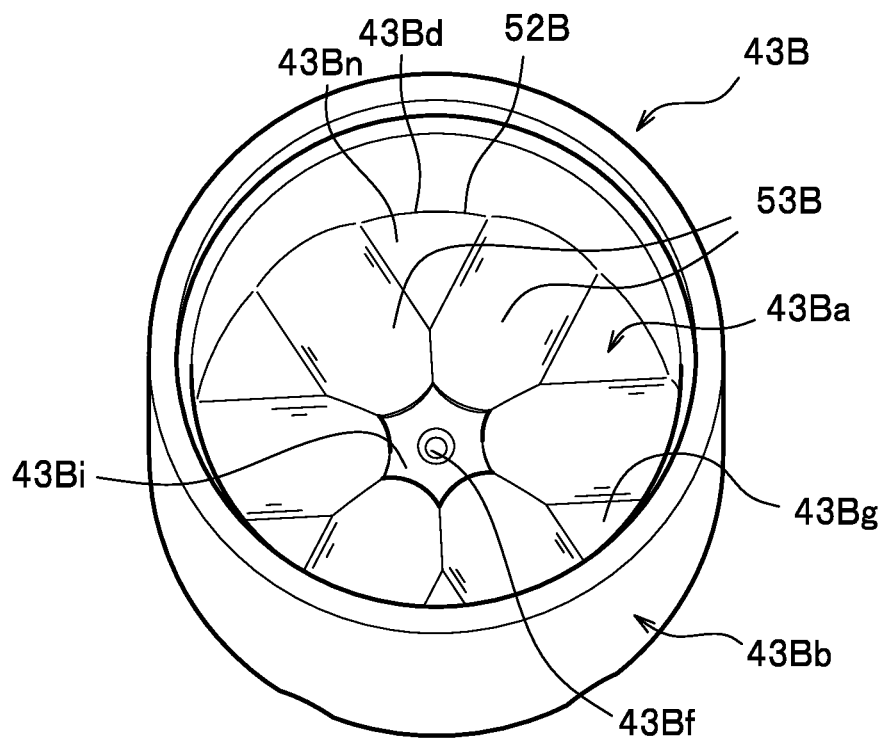

BALL JOINT, STABILIZER LINK, AND BALL JOINT MANUFACTURING METHOD

CROSS-REFERENCE TO RELATED APPLICATION

This application is based upon and claims priority from Japanese Patent Application No. 2018-141816, filed Jul. 27, 2018, the entire contents of which are expressly incorporated herein by reference.

TECHNICAL FIELD

The present invention relates to a ball joint, a stabilizer link, and a method for manufacturing the ball joint.

BACKGROUND ART

Patent Literature 1 discloses an invention of a ball joint in which a ball portion of a ball stud is housed in a metal housing in a bottomed cylindrical shape. The ball stud is supported by the housing such that the ball stud can swing with the ball portion as the pivot. Between the housing and the ball portion is provided a resin ball seat interposed in between. When the ball stud swings relative to the housing, the ball portion slides relative to the ball seat.

The ball joint according to Patent Literature 1 (see FIG. 2 of Patent Literature 1) includes an outer ball joint and an inner ball joint. The outer ball joint is connected to the inner ball joint through a bar-shaped tie rod (a support bar).

On the outer ball joint side, the axis of the ball stud extends in a radial direction relative to the axis of the support bar extending linearly. On the inner ball joint side, unlike the above, the axis of the ball stud extends coaxially with the support bar. In the following description, the former will be referred to as a radial ball joint, and the latter will be referred to as an axial ball joint.

In the axial ball joint according to Patent Literature 1, as mentioned above, the ball portion of the ball joint is slidably housed inside the metal housing with the resin ball seat interposed in between. A rod-shaped connecting bar (a connecting portion; see FIG. 2 of Patent Literature 1) that is connected to an end portion of a rack shaft is provided to the bottom wall of the metal housing coaxially along the axis of the support bar and the ball stud.

CITATION LIST

Patent Literature

Patent Literature 1: Japanese Patent Application Publication No. 2010-101416

SUMMARY OF INVENTION

Technical Problem

For the axial ball joint of the ball joints according to Patent Literature 1, the connecting bar is welded to the bottom wall of the metal housing. Accordingly, the bottom wall of the housing is set thicker than the peripheral side wall of the housing so that the bottom wall can withstand an input of an axial load from the connecting bar. This setting requires a selection of a press working process or the like in the manufacturing process of the housing that allows a design having different thicknesses between the bottom wall and the peripheral side wall. This decreases the degree of freedom in selection of the manufacturing process of the housing and increases the weight, loads necessary for processing, and the manufacturing cost. These are points to be improved.

The present invention has been made in view of the above-mentioned circumstances. An object of the present invention is to provide a ball joint, a stabilizer link, and a method for manufacturing the ball joint that contribute weight saving and cost down while providing enough stiffness for the housing.

Solution to Problem

To solve the aforementioned problems, a ball joint according to the present invention is characterized in that the ball joint includes: a ball stud including a stud portion and a ball portion; a metal housing that rotatably supports the ball portion of the ball stud; and a resin ball seat interposed between the ball portion and the housing, the housing has a bottomed cylindrical shape formed by press work, the housing has a bottom wall and a peripheral side wall having a substantially equal thickness, and the housing has an inner bottom having a plurality of bead portions formed by press work or forging.

A method for manufacturing a ball joint according to the present invention is a method for manufacturing a ball joint including a ball stud including a stud portion and a ball portion, a metal housing that rotatably supports the ball portion of the ball stud, and a resin ball seat interposed between the ball portion and the housing, characterized in that the method includes the steps of: forming the housing by press work or forging; attaching a support bar to a bottom wall of the housing; fitting the ball stud with the ball seat attached thereto into an internal space of the housing; and integrating the ball stud with the ball seat attached thereto with the housing by performing a bending process of bending an opening peripheral edge portion of the housing inward, and the step of forming the housing by press work or forging includes a step of performing drawing for the housing and forming a bead portion in the bottom wall of the housing.

Advantageous Effects of Invention

The present invention makes it possible to provide a ball joint, a stabilizer link, and a method for manufacturing the ball joint that contribute weight saving and cost down while providing enough stiffness for the housing.

BRIEF DESCRIPTION OF DRAWINGS

FIG. 6C is a cross-sectional perspective view of the internal space of the housing serving as a constituent member of the ball joint according to the first modification of the embodiment of the present invention, which is viewed through the opening of the housing.

FIG. 7A is a perspective view of the internal space of a housing serving as a constituent member of a ball joint according to a second modification of the embodiment of the present invention, which is viewed through the opening of the housing.

DESCRIPTION OF EMBODIMENTS

Hereinafter, a detailed description will be given of a ball joint, a stabilizer link, and a method for manufacturing the ball joint according to an embodiment of the present invention with reference to the drawings as appropriate.

Note that members having common functions or members having functions corresponding to one another in the figures shown below will be basically denoted by common reference signs. For the convenience of explanation, the sizes and shapes of members may be schematically illustrated in a deformed manner or an exaggerated manner in some cases.

<Stabilizer Link 11 According to Embodiment of Present Invention and Schematic Configurations of its Surroundings>

Figure 1:
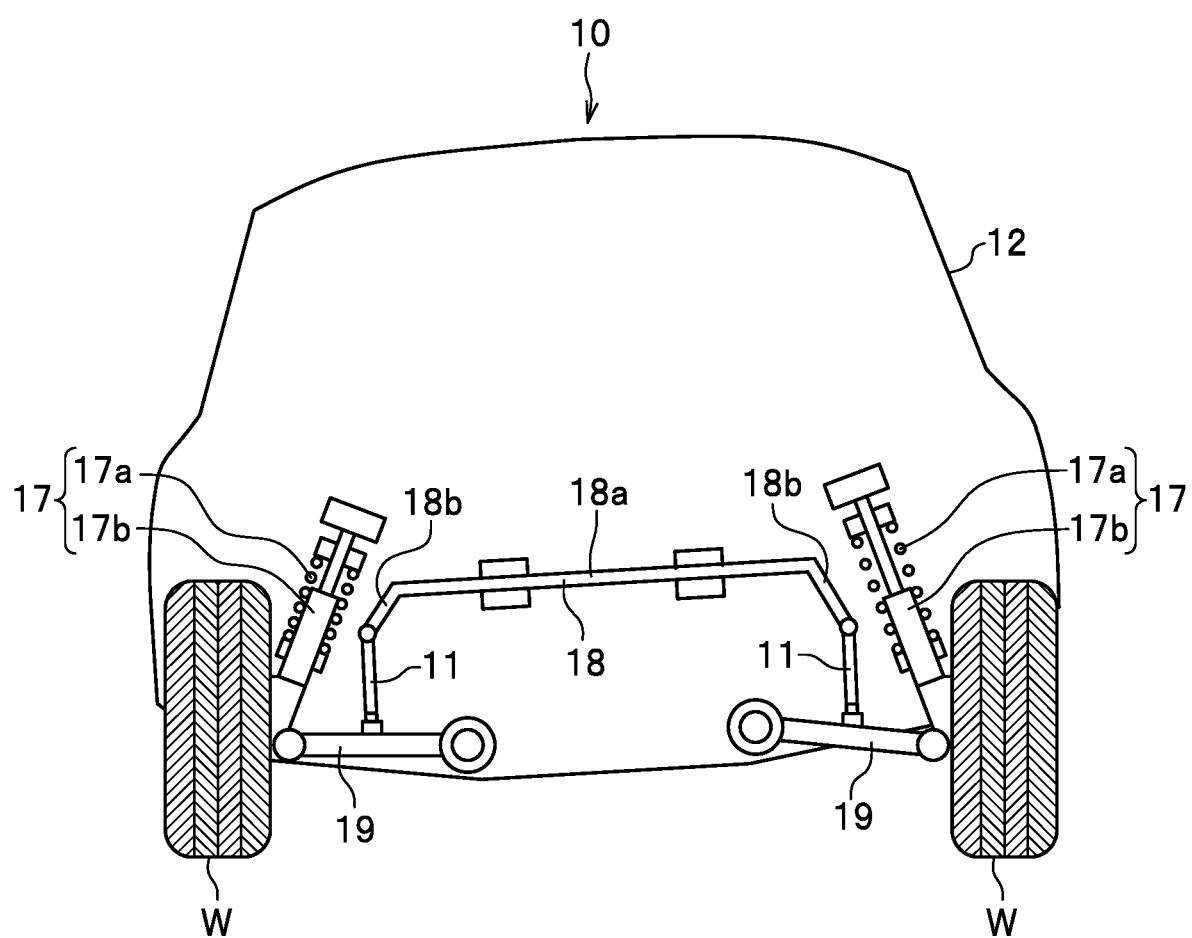
FIG. 1 is a perspective view of stabilizer links according to an embodiment of the present invention, which are attached to a vehicle.
Figure 2:
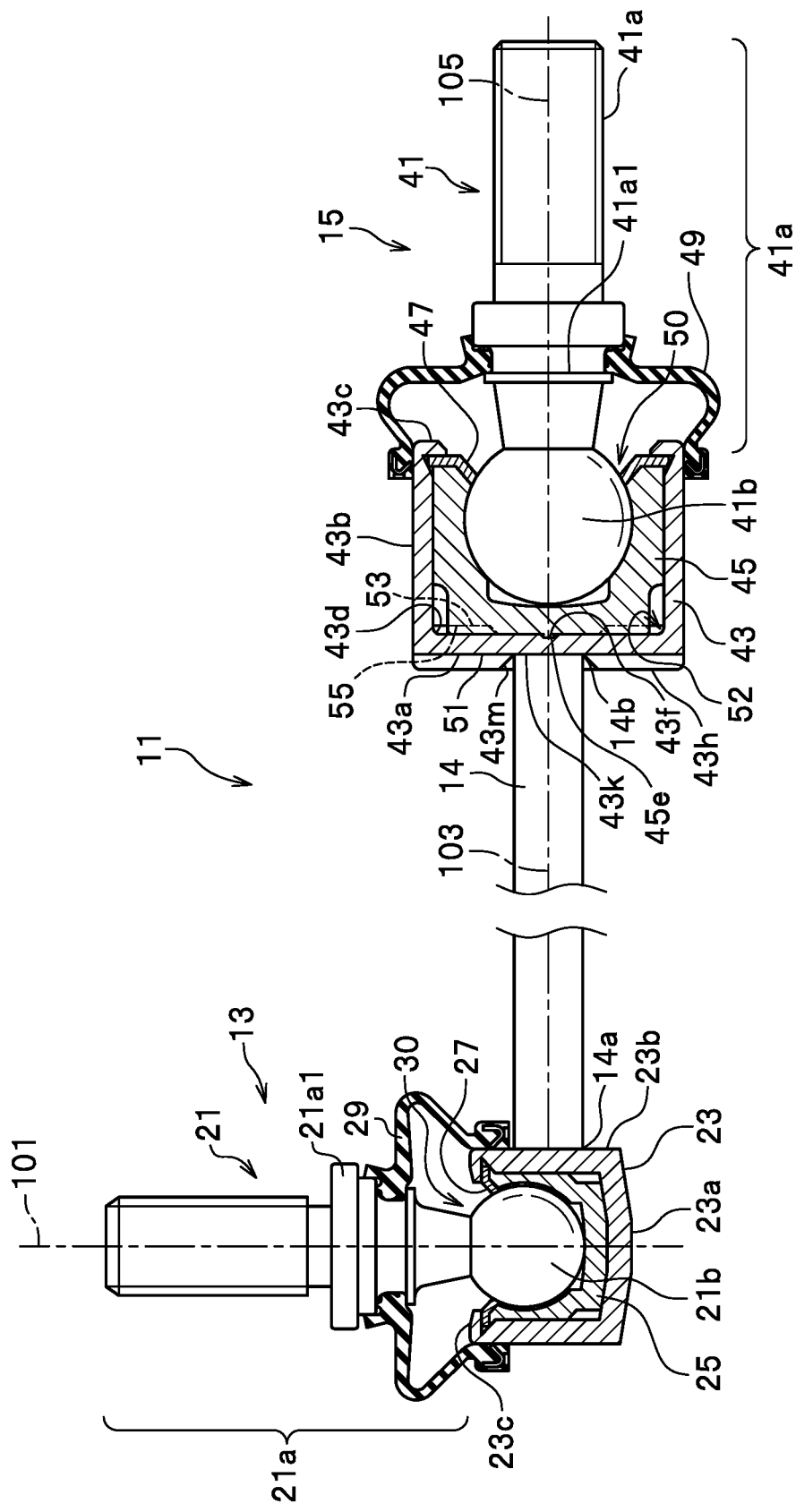
FIG. 2 is a cross-sectional view of the overall configuration of the stabilizer link according to the embodiment of the present invention.

First, the following describes a stabilizer link 11 according to an embodiment of the present invention and schematic configurations of its surroundings, based on an example in which the stabilizer link 11 is attached to a vehicle 10. FIG. 1 is a perspective view of the stabilizer links 11 according to the embodiment of the present invention, which are attached to the vehicle 10. FIG. 2 is a cross-sectional view of the overall configuration of the stabilizer link 11 according to the embodiment of the present invention.

As shown in FIG. 1, the vehicle 10 has a vehicle body 12 and wheels W attached to the vehicle body 12 through axle sides of suspension devices 17. Each suspension device 17 includes a coil spring 17a and a shock absorber 17b in order to absorb and reduce shocks and vibrations transmitted from the road surface to the vehicle body 12 through the wheel W. Although the suspension device 17 is not limited to a particular device, a MacPherson strut-type device can be favorably used for this application, for example.

As shown in FIG. 1, the right and left suspension devices 17 are connected to each other through a stabilizer 18 formed of a substantially U-shaped spring steel rod and the like. In order to increase the roll stiffness (resistance against torsional deformation) of the vehicle body 12 to reduce the rolling of the vehicle 10, the stabilizer 18 includes a torsion bar portion 18a extending between the right and left wheels W and a pair of arm portions 18b that extend from bent portions at both ends of the torsion bar portion 18a.

Each arm portion 18b of the stabilizer 18 is connected through the stabilizer link 11 to a lower arm 19 that elastically supports the axle side of the suspension device 17. The way of connection is the same between the right and left wheel W sides. As shown in FIG. 2, the stabilizer link 11 includes a substantially straight support bar 14 made of a metal such as steel, for example, and a pair of ball joints 13 and 15 which are provided respectively at both ends of the support bar 14.

Of the pair of ball joints 13 and 15 shown in FIG. 2, one is an existing radial ball joint 13, and the other is an axial ball joint 15 according to the present invention.

As shown in FIG. 2, the radial ball joint 13 includes a metal ball stud 21, a metal housing 23, and a resin ball seat 25. The ball stud 21 has a columnar stud portion 21a and a spherical ball portion 21b formed at one end of the columnar stud portion 21a. The housing 23 includes a bottom wall 23a and a peripheral side wall 23b. The housing 23 has a bottomed cylindrical shape formed by forging, for example, cold forging or hot forging.

The resin ball seat 25 is interposed between the ball portion 21b of the ball stud 21 and the housing 23. The ball stud 21, when receiving no load, is positioned in a neutral position shown in FIG. 2. The ball stud 21 is supported by the housing 23 such that the ball stud 21 can swing and rotate with the ball portion 21b as the pivot when receiving a load.

In order to keep the ball portion 21b of the ball stud 21 from coming off the internal space of the housing 23, a C-shaped stop ring 27 designed to hold the spherical surface of the ball portion 21b is provided at an opening peripheral edge portion 23c of the housing 23 in the state where the ball portion 21b of the ball stud 21 is housed in the internal space of the housing 23.

In the radial ball joint 13 configured as described above, the ball portion 21b of the ball stud 21 slides relative to the ball seat 25 when the ball stud 21 swings relative to the housing 23. The ball portion 21b of the ball stud 21 also slides relative to the ball seat 25 when the ball stud 21 rotates on its axis 101 relative to the housing 23.

As shown in FIG. 2, the stud portion 21a of the ball stud 21 has a disc-shaped flange portion 21a1. The gap between the flange portion 21a1 and the opening peripheral edge portion 23c of the housing 23 is covered with a looped dust cover 29 formed of an elastic material such as rubber. The dust cover 29 plays a role to prevent foreign substances including rainwater and dust from entering the joint portion 30.

In order to establish two-way transmission of loads between the pair of ball joints 13 and 15, an end 14a of the support bar 14 is joined by welding to the peripheral side wall 23b of the housing 23.

In the radial ball joint 13, the axis 101 of the ball stud 21 in the neutral position extends in a radial direction relative to the axis 103 of the support bar 14 that extends straight along the axial direction as shown in FIG. 2. This is why this ball joint 13 is called a radial type.

In the axial ball joint 15 according to the present invention, unlike the ball joint 13, the axis 105 of a ball stud 41 in the neutral position is coaxial with the axis 103 of the support bar 14 which extends straight along the axial direction as shown in FIG. 2. This is why this ball joint 15 is called an axial type.

As shown in FIG. 2, the axial ball joint 15 includes the ball stud 41 made of a metal, a metal housing 43, and a resin ball seat 45 as with the above-mentioned radial ball joint 13. The ball stud 41 has a columnar stud portion 41a and a spherical ball portion 41b formed at one end of the columnar stud portion 41a.

Although the metal material for the housing 43 is not limited to a particular material, for example, a material having good malleability such as steel, aluminum, and copper is favorable for the use. In this case, a metal material having an elongation of 30% or more is recommended for the metal material of the housing 43. Although the resin material for the ball seat 45 is not limited to a particular material, for example, a thermoplastic resin such as POM is favorable for the use.

The housing 43 has a bottomed cylindrical shape formed by sheet-metal press work including drawing and rib forming or by forging. The housing 43 has a bottom wall 43a and a peripheral side wall 43b having a substantially equal thickness t1 (see FIG. 3E). The manufacturing process of the housing 43 will be described later in detail.

The inner bottom 43g of the housing 43 has a plurality of bead portions 53 (see FIG. 3A) to increase the deformation strength of the bottom wall 43a. The configuration of the bead portions 53 will be described later in detail.

The resin ball seat 45 is interposed between the ball portion 41b of the ball stud 41 and the housing 43. The configuration of the ball seat 45 will be described later in detail. The ball stud 41, when receiving no load, is positioned in a neutral position shown in FIG. 2. The ball stud 41 is supported by the housing 43 such that the ball stud 41 can swing and rotate with the ball portion 41b as the pivot when receiving a load.

In order to keep the ball portion 41b of the ball stud 41 from coming off the internal space of the housing 43, a C-shaped stop ring 47 designed to hold the spherical surface of the ball portion 41b is provided at an opening peripheral edge portion 43c of the housing 43 in the state where the ball portion 41b of the ball stud 41 is housed in the internal space of the housing 43.

In the axial ball joint 15 configured as described above, the ball portion 41b of the ball stud 41 slides relative to the ball seat 45 when the ball stud 41 swings relative to the housing 43. The ball portion 41b of the ball stud 41 also slides relative to the ball seat 45 when the ball stud 41 rotates on the axis 101 of the support bar 14 relative to the housing 43.

As shown in FIG. 2, the stud portion 41a of the ball stud 41 has a disc-shaped flange portion 41a1. The gap between the flange portion 41a1 and the opening peripheral edge portion 43c of the housing 43 is covered with a looped dust cover 49 formed of an elastic material such as rubber. The dust cover 49 plays a role to prevent foreign substances including rainwater and dust from entering the joint portion 50.

Figure 3A:
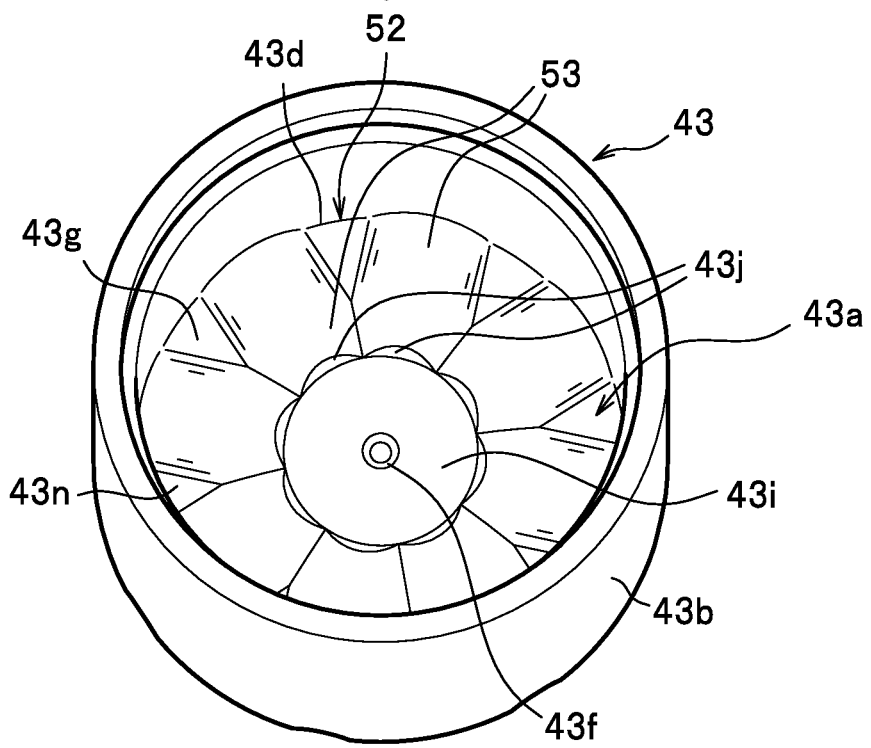
FIG. 3A is a perspective view of the internal space of a housing serving as a constituent member of a ball joint according to the embodiment of the present invention, which is viewed through an opening of the housing.
Figure 3B:
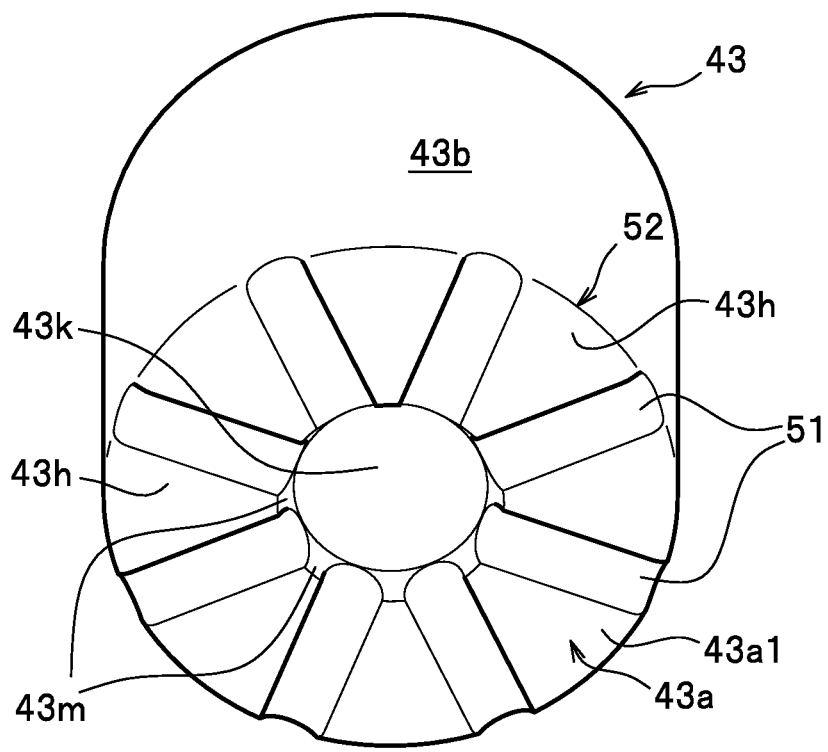
FIG. 3B is a perspective view of the outer appearance of the housing illustrated in FIG. 3A, which is viewed obliquely from a bottom side of the housing.
Figure 3C:
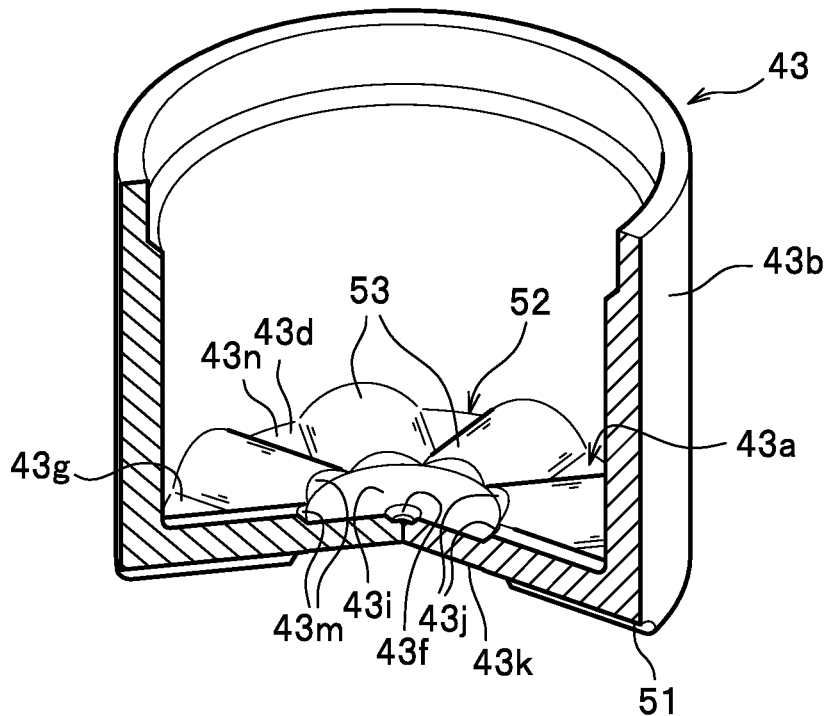
FIG. 3C is a cross-sectional perspective view of the internal space of the housing illustrated in FIG. 3A, which is viewed through the opening of the housing.
Figure 3D:
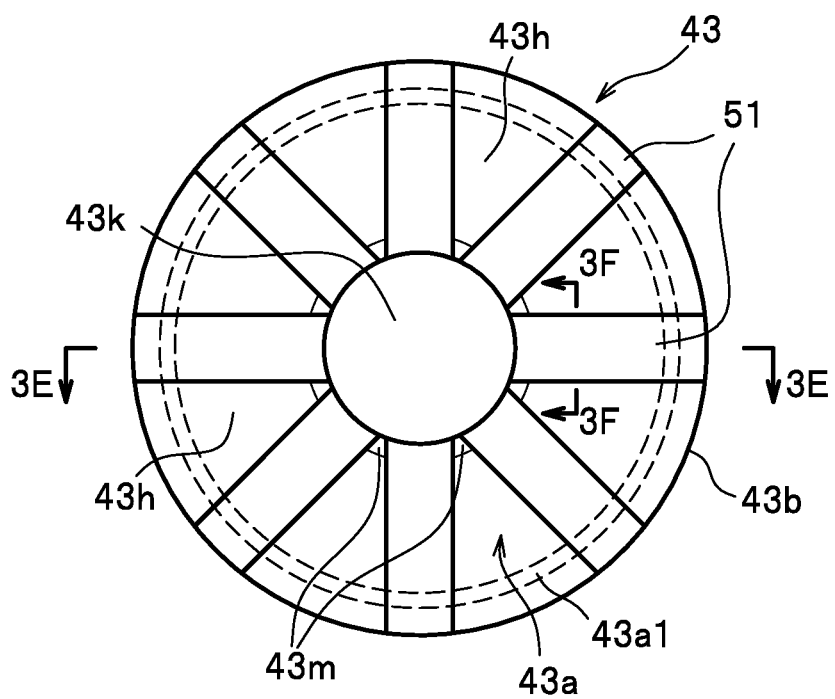
FIG. 3D is a bottom view of the housing illustrated in FIG. 3A.
Figure 3E:
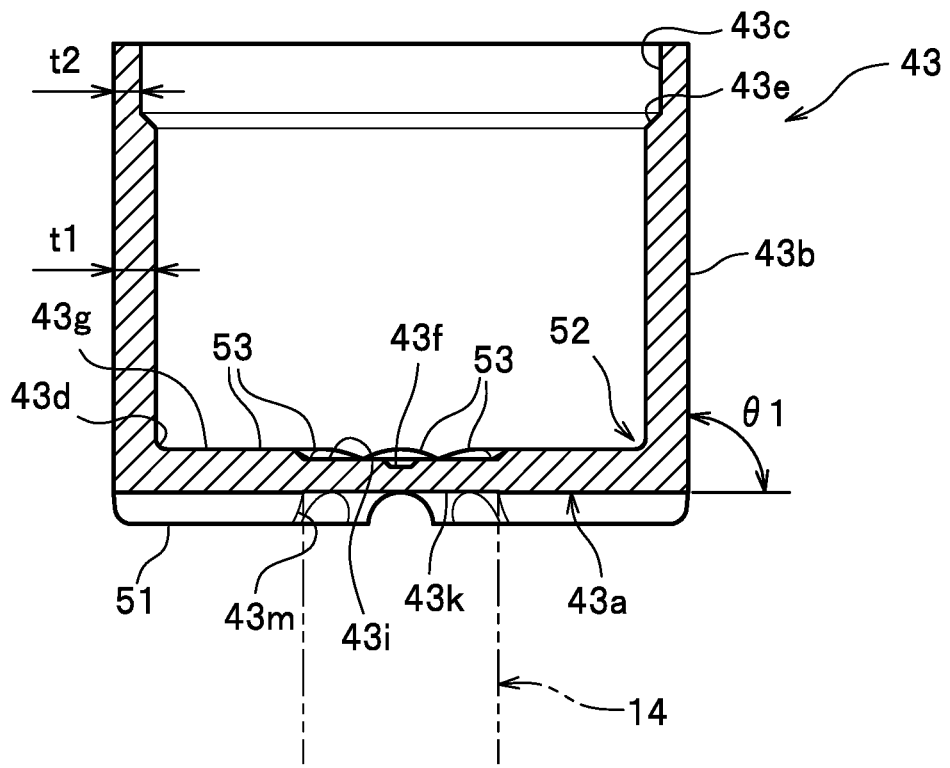
FIG. 3E is a cross-sectional view from 3E-3E in FIG. 3D.

In order to establish two-way transmission of loads between the pair of ball joints 13 and 15, the other end 14b of the support bar 14 is joined by welding to a flat support-bar joint surface 43k formed in the center of the outer bottom 43h of the housing 43 (see FIG. 3E). Here, in the axial ball joint 15, the axis 105 of the ball stud 41 in the neutral position is coaxial with the axis 103 of the support bar 14 as shown in FIG. 2. Hence, depending on the direction of a load that acts on the support bar 14 or the ball stud 41, an axial load occurs in the detaching direction in which the ball stud 21 comes off the housing 23.

In order to withstand axial loads in the detaching direction in which the ball stud 21 comes off the housing 23, the axial ball joint 15 is required to have a greater axial-load bearing resistance in the detaching direction than the radial ball joint 13.

To meet this demand, the size of the ball stud 41 (including the spherical diameter of the ball portion 41b) in the axial ball joint 15 is set larger than the size of the ball stud 21 (including the spherical diameter of the ball portion 21b) in the radial ball joint 13. In addition, the sizes of the housing 43 (including the thickness t1 of the bottom wall 43a and the peripheral side wall 43b (see FIG. 3E)) and of the ball seat 45 in the axial ball joint 15 are also set larger than the sizes of the housing 23 (including the thickness of the bottom wall 23a and the peripheral side wall 23b) and of the ball seat 25 in the radial ball joint 13.

<Housing 43 Serving as Constituent Member of Ball Joint 15 According to Embodiment of Present Invention>

Next, the metal housing 43 serving as a constituent member of the ball joint 15 according to the embodiment of the present invention will be described with reference to FIGS. 3A to 3F.

Figure 3F:
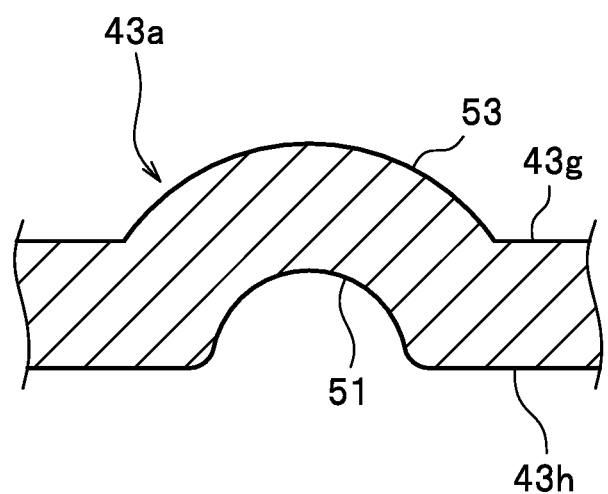
FIG. 3F is an enlarged cross-sectional view from 3F-3F in FIG. 3D.

FIG. 3A is a perspective view of the internal space of the housing serving as a constituent member of the ball joint according to the embodiment of the present invention, which is viewed through the opening of the housing. FIG. 3B is a perspective view of the outer appearance of the housing illustrated in FIG. 3A, which is viewed obliquely from the bottom side. FIG. 3C is a cross-sectional perspective view of the internal space of the housing illustrated in FIG. 3A, which is viewed through the opening of the housing. FIG. 3D is a bottom view of the housing illustrated in FIG. 3A. FIG. 3E is a cross-sectional view taken along 3E-3E in FIG. 3D. FIG. 3F is an enlarged cross-sectional view taken along 3F-3F in FIG. 3D.

As shown in FIG. 3A, the housing 43 serving as a constituent member of the axial ball joint 15 according to the embodiment of the present invention has a bottomed cylindrical shape including the substantially disc-shaped bottom wall 43a and the cylindrical peripheral side wall 43b which continues from the bottom wall 43a. As shown in FIG. 3E, the opening peripheral edge portion 43c of the peripheral side wall 43b has a thickness t2 smaller than the thickness t1 of the peripheral side wall 43b (t1>t2) and is formed with a looped step portion 43e in between. The bottom wall 43a and the peripheral side wall 43b of the housing 43 have a substantially equal thickness (a thickness of t1).

The inner bottom 43g of the housing 43 has, as illustrated in FIG. 3A, a housing recess 43f, a center flat surface 43i, the plurality of bead portions 53, and tapered portions 43j. The outer bottom 43h of the housing 43 has, as illustrated in FIG. 3B, the support-bar joint surface 43k, a plurality of recessed grooves 51, and inclined surfaces 43m formed between the support-bar joint surface 43k and the outer bottom 43h.

The inner bottom 43g of the housing 43 has the housing recess 43f at its inner central portion, the housing recess 43f been configured to house a substantially columnar projection 45e provided on the ball seat 45 illustrated in FIG. 2, for example. The housing recess 43f (see FIG. 3C) has a tapered shape the diameter of which gradually decreases toward the bottom. The function of the housing recess 43f will be described later in detail.

The standing angle θ1 shown in FIG. 3E formed by the bottom wall 43a and the peripheral side wall 43b of the housing 43 is set to an appropriate angle within an angle range of 60° to 90°. In the example shown in FIG. 3E, the standing angle θ1 is set to 90°, which is a desirable angle to increase the deformation strength (deformation resistance) related to the boundary portion 52.

Here, in the case where the standing angle θ1 is set to an angle below 90°, for example, 85° or the like, the peripheral side wall 43b has, relative to the bottom wall 43a of the housing 43, a tapered shape the diameter of which gradually increases toward the opening peripheral edge portion 43c. In this case, if a jig (not shown) having a shape in conformity to this tapered shape is used to position the housing 43, the housing 43 can be easily centered relative to the jig (not shown) because of a so-called self-centering effect.

In addition, in the case where the standing angle θ1 is set to an angle below 90°, for example, 85° or the like, it is possible to obtain an effect that the amount of metal material necessary to form the housing 43 is small (an effect of reducing the weight at the same time). The standing angle θ1 may be 30° or less from the bottom surface line to form a tapered shape.

The bottom wall 43a of the housing 43 has, as illustrated in FIG. 3A, the bead portions 53 to increase the deformation strength and minimize the thickness. The bead portions 53 are provided at specified intervals in the circumferential direction of the inner-bottom corner portion 43d to extend from the inner-bottom corner portion 43d to the center flat surface 43i. In the example of FIG. 3A, eight bead portions 53 are provided at equal intervals in the circumferential direction to extend radially from the center flat surface 43i to the inner-bottom corner portion 43d at the boundary portion 52. More specifically, each of the bead portions 53, as illustrated in FIG. 3F, is formed to be bulged in an arc shape in a longitudinal-sectional view.

As described above, the housing 43 of the axial ball joint 15 is formed in a bottomed cylindrical shape by sheet-metal press work including drawing and rib forming or by forging. Hence, in the bottom wall 43a of the housing 43, the back-side (the outer bottom 43h) portions corresponding to the bead portions 53 have, as illustrated in FIG. 3F, the recessed grooves 51 each recessed from the outside to the inside of the housing 43 to conform to the shape of the bead portion 53.

As illustrated in FIG. 3B, the recessed grooves 51 respectively corresponding to the bead portions 53 are positioned at specified intervals in the direction of a circumference near the outer peripheral edge portion 43a1 of the bottom wall 43a.

In the example of FIG. 3B, the outer bottom 43h of the housing 43 has eight recessed grooves 51, each having a radius of 2 mm in longitudinal-sectional view, provided from the support-bar joint surface 43k to the outer peripheral edge portion 43a1.

Note that it is preferable that the number of the bead portions 53 and the recessed grooves 51 be three or more and less than 13 and that the bead portions 53 and the recessed grooves 51 are arranged at equal intervals in the circumferential direction. It is more preferable that the number of the bead portions 53 be four, six, or eight.

The bead portions 53 and the recessed grooves 51 cooperate to play roles to increase the deformation strength related to the bottom wall 23a of the housing 43. The radius (R) of the bead portion 53 and the recessed groove 51 having an arc shape in cross-sectional view may be appropriately changed as necessary. In addition, the bead portion 53 and the recessed groove 51 configured to be engaged with each other should preferably be formed to have a small clearance in between when engaged.

<Ball Seat 45 Serving as Constituent Member of Ball Joint 15 According to Embodiment of Present Invention>

Next, the ball seat 45 serving as a constituent member of the axial ball joint 15 will be described with reference to FIGS. 4A to 4D.

Figure 4A:
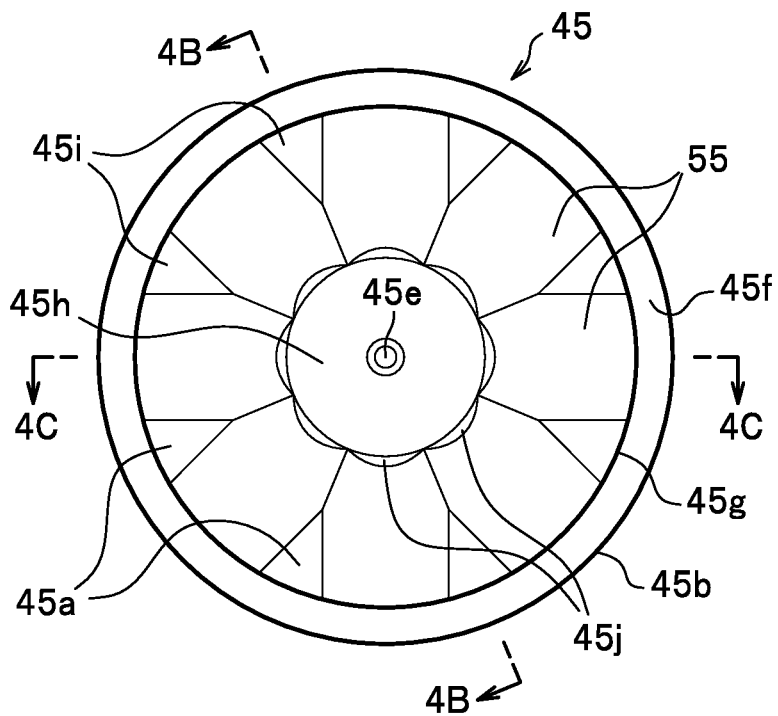
FIG. 4A is a bottom view of a ball seat serving as a constituent member of the ball joint according to the embodiment of the present invention.
Figure 4B:
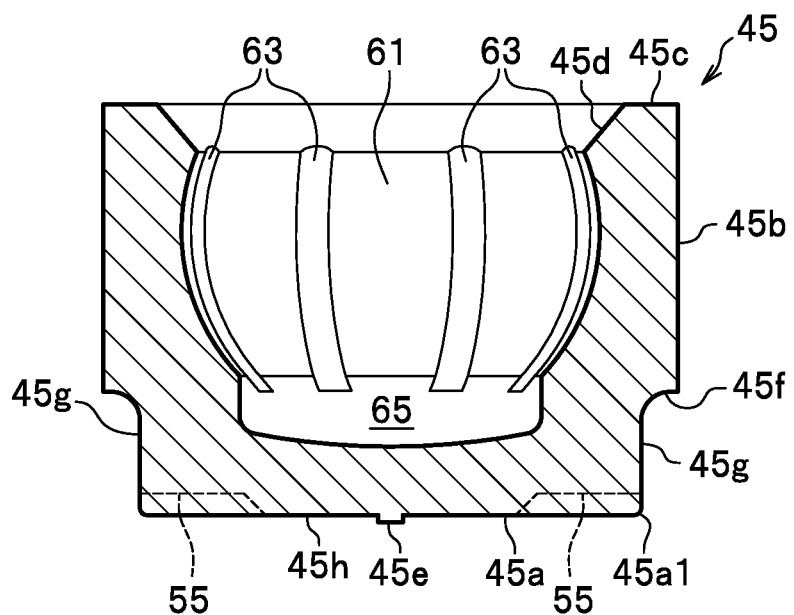
FIG. 4B is a cross-sectional view of the ball seat illustrated in FIG. 4A, taken along line 4B-4B and viewed in the direction of the arrows.
Figure 4C:
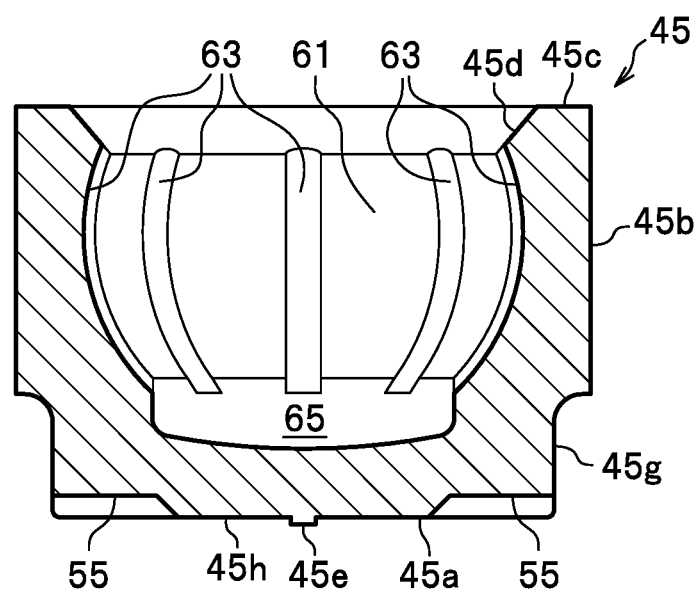
FIG. 4C a cross-sectional view of the ball seat illustrated in FIG. 4A, taken along line 4C-4C and viewed in the direction of the arrows.
Figure 4D:
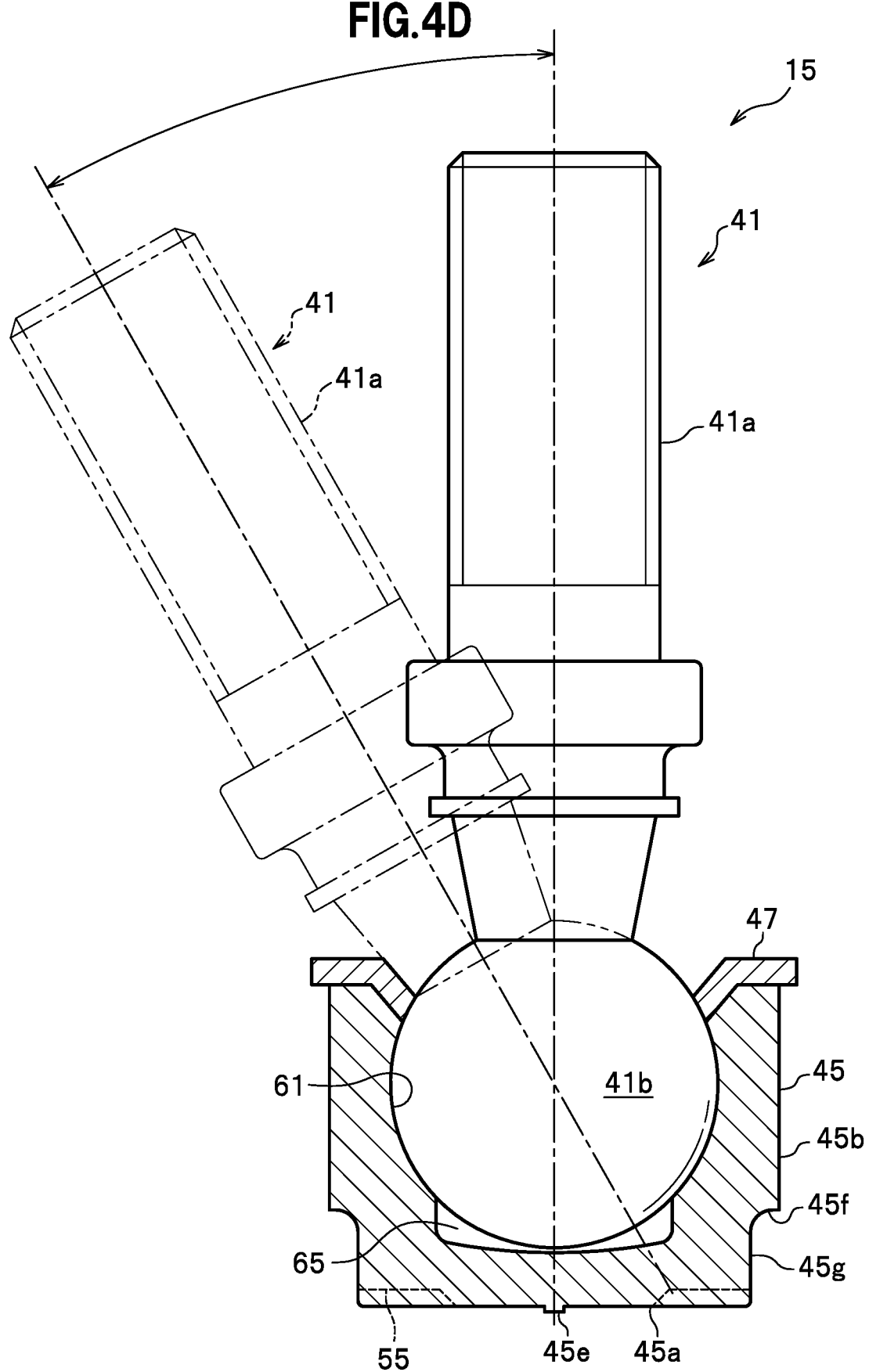
FIG. 4D is a diagram showing the ball seat to which a ball portion of a ball stud is attached.

FIG. 4A is a bottom view of the ball seat 45 serving as a constituent member of the ball joint 15 according to the embodiment of the present invention. FIG. 4B is a cross-sectional view of the ball seat 45 illustrated in FIG. 4A, which is taken along line 4B-4B and viewed in the direction of the arrows. FIG. 4C is a cross-sectional view of the ball seat 45 illustrated in FIG. 4A, which is taken along line 4C-4C and viewed in the direction of the arrows. FIG. 4D is a diagram showing the ball seat 45 to which the ball portion 41b of the ball stud 41 is attached.

As shown in FIGS. 4A to 4D, the resin ball seat 45 serving as a constituent member of the axial ball joint 15 (see FIG. 2) has a bottomed cylindrical shape including a substantially disc-shaped bottom wall 45a and a cylindrical peripheral side wall 45b which continues from the bottom wall 45a. On top of the peripheral side wall 45b is formed a looped opening peripheral edge portion 45c. On the inner peripheral side of the opening peripheral edge portion 45c is formed a looped inclined surface 45d the diameter of which gradually increases toward the opening. The ball seat 45 is manufactured by injection molding using a thermoplastic resin for its raw material.

The outside diameter dimension related to the peripheral side wall 45b of the ball seat 45 is set to be slightly smaller than the inside diameter dimension related to the peripheral side wall 43b of the housing 43 as shown in FIG. 2.

As shown in FIGS. 4A to 4C, below the peripheral side wall 45b of the ball seat 45 is a small diameter peripheral side wall 45g that has a smaller diameter dimension (for example, a diameter difference of 2 mm or more) than the peripheral side wall 45b and is formed with a looped step portion 45f provided in between. The small diameter peripheral side wall 45g plays a role to obviate the situation in which the outer peripheral edge portion 45a1 (see FIG. 4B) of the bottom wall 45a of the ball seat 45 touches and interferes with the inner-bottom corner portion 43d (see FIG. 3A) of the housing 43 when the ball seat 45 is housed in the internal space of the housing 43. Note that the ball seat 45 may have a chamfer below the peripheral side wall 45b instead of the small diameter peripheral side wall 45g.

The bottom wall 45a of the ball seat 45 has the substantially columnar projection 45e at its central portion as shown in FIGS. 4A to 4C. The projection 45e of the ball seat 45 is an engagement protrusion (see FIG. 2) designed to be engaged with the housing recess 43f of the housing 43 in the state where the ball seat 45 is properly attached to the internal space of the housing 43 (see FIG. 2). The projection 45e is a small columnar protrusion formed in the central portion of the bottom wall 45a. In short, the housing recess 43f of the housing 43 and the projection 45e of the ball seat 45 cooperate to play roles to help the ball seat 45 be properly positioned when attached to the internal space of the housing 43.

As shown in FIGS. 4B and 4C, the ball seat 45 has a substantially spherical support portion 61 for slidably supporting the ball portion 41b of the ball stud 41 (see FIG. 4D). The substantially spherical support portion 61 has a plurality of grease grooves 63 carved along the direction of the axis 105 (see FIG. 2) of the ball stud 41 in the neutral state. The grease grooves 63 hold grease (not shown) for smoothly sliding the ball portion 41b of the ball stud 41 (see FIG. 4D). Below the support portion 61 is provided a grease reservoir 65 for collecting grease flowing down through the grease grooves 63.

The bottom wall 45a of the ball seat 45, as illustrated in FIG. 4A, has the projection 45e, a circular flat surface 45h, a plurality of sector-shaped flat surfaces 45i, and a plurality of housing recesses 55.

The circular flat surface 45h is an engagement portion configured to be engaged with the center flat surface 43i (see FIG. 3C) of the housing 43. The circular flat surface 45h is a circular flat surface formed around the projection 45e. The circular flat surface 45h has a diameter 2 mm or more larger than the diameter of the support bar 14.

The sector-shaped flat surfaces 45i are engagement surfaces each having a sector shape (approximately triangular shape) and configured to be engaged with a sector-shaped inner bottom surface 43n formed between adjacent ones of the bead portions 53 of the housing 43 (see FIG. 3C). The sector-shaped flat surfaces 45i are eight flat surfaces each formed radially from a position near the outer periphery of the circular flat surface 45h to the outer peripheral edge of the bottom wall 45a. At the end on the circular flat surface 45h side of each sector-shaped flat surface 45i is formed a tapered surface 45j.

The housing recesses 55 are engagement recesses with which the bead portions 53 of the housing 43 are respectively engaged (see FIGS. 2 and 3C). In other words, the portions of the ball seat 45, corresponding to the bead portions 53, each have a housing recess 55 for housing the bead portion 53. The housing recess 55 is a groove, in an arc shape in cross-sectional view, formed from an outer periphery portion of the circular flat surface 45h to the outer peripheral edge of the bottom wall 45a.

The sector-shaped flat surfaces 45i and the housing recesses 55 are formed alternately in the circumferential direction between the outer periphery portions of the circular flat surface 45h and the outer peripheral edge of the bottom wall 45a. The layout, shape, number, and dimensions of the housing recesses 55 are set to those that allow the bead portions 53 of the housing 43 to just fit the housing recesses 55 (see FIG. 3C).

In the state where the ball seat 45 is properly attached to the correct position in the internal space of the housing 43 illustrated in FIG. 3A or FIG. 4A, the bead portions 53 of the housing 43 are engaged with the housing recesses 55 of the ball seat 45. This makes it possible to obviate a positional error of the ball seat 45 relative to the housing 43 in the circumferential direction (to prevent the ball seat 45 from rotating).

The bead portions 53 and the respective housing recess 55 cooperate to play roles to facilitate the centering and positioning of the ball seat 45 relative to the housing 43.

In the state where the ball seat 45 is properly attached to the correct position in the internal space of the housing 43, the housing 43 and the ball seat 45 are in contact with each other between the inner side of the peripheral side wall 43b and the outer side of the peripheral side wall 45b and, in addition to it, between the inner side of the bottom wall 43a and the outer side of the bottom wall 45a and between the bead portions 53 and the housing recesses 55.

Concerning contact strengths of these portions, a configuration may be adopted in which the contact strength between the bottom wall 43a and the bottom wall 45a is set lightly larger than the contact strength between the bead portions 53 and the housing recesses 55. The setting of the contact strengths of those portions may be achieved by adjusting the height dimensions of the bead portions 53.

This configuration combines the friction force caused by the contact between the bottom wall 43a and the bottom wall 45a and the engagement force caused by the contact between the bead portions 53 and the housing recesses 55, thereby favorably promoting the integration between the housing 43 and the ball seat 45.

When the axial ball joint 15 configured as described above is not receiving a load, which state is illustrated with solid lines in FIG. 4D, the ball stud 41 is positioned in the neutral position with the ball portion 41b supported by the housing 43 (see FIG. 2) as the pivot. When the axial ball joint 15 is receiving a load, which state is illustrated with chain double-dotted lines in FIG. 4D, the ball stud 41 swings as shown in FIG. 4D with the ball portion 41b supported by the housing 43 as the pivot.

Now, assume that a load is inputted to the bottom wall 43a of the housing 43 in the axial ball joint 15 through the support bar 14 illustrated in FIG. 2. The load inputted to the bottom wall 43a of the housing 43 is transmitted to the peripheral side wall 43b of the housing 43.

Here, the housing 43 has the elongated bead portions 53 at the boundary portion 52 between the bottom wall 43a of the housing 43 and the peripheral side wall 43b of the housing 43, each bead portions 53 having a convex shape in longitudinal-sectional view, formed by sheet-metal press work including drawing and bead forming (beading) performed in the manufacturing process of the housing 43. The boundary portion 52 of the peripheral side wall 43b has ridge lines. Thus, the deformation strength of the entire bottom wall 43a is significantly higher than the configuration without bead portions 53.

Note that the process of forming the housing 43 is not limited to press work but may be forging such as cold forging or hot forging.

Thus, even in the case where a load is inputted to the bottom wall 43a of the housing 43 through the support bar 14 and if the load is large, the axial ball joint 15 can properly transmit the load to the peripheral side wall 23b of the housing 43 without causing a deformation related to the boundary portion 52.

Thus, for the axial ball joint 15, the housing 43 has a bottomed cylindrical shape formed by sheet-metal press work including drawing and rib forming, and the bottom wall 43a of the housing 43 has the bead portions 53 extending from the inner-bottom corner portion 43d to the center flat surface 43i. This configuration makes it possible to expand the degree of freedom in selection of the manufacturing process of the housing 43, contribute to weight saving, and simplify the manufacturing process.

<Method for Manufacturing Ball Joint 15 According to Embodiment of Present Invention>

Next, a method for manufacturing a ball joint according to the embodiment of the present invention will be described mainly with reference to FIG. 5, by taking the axial ball joint 15 as an example of a ball joint.

Figure 5:
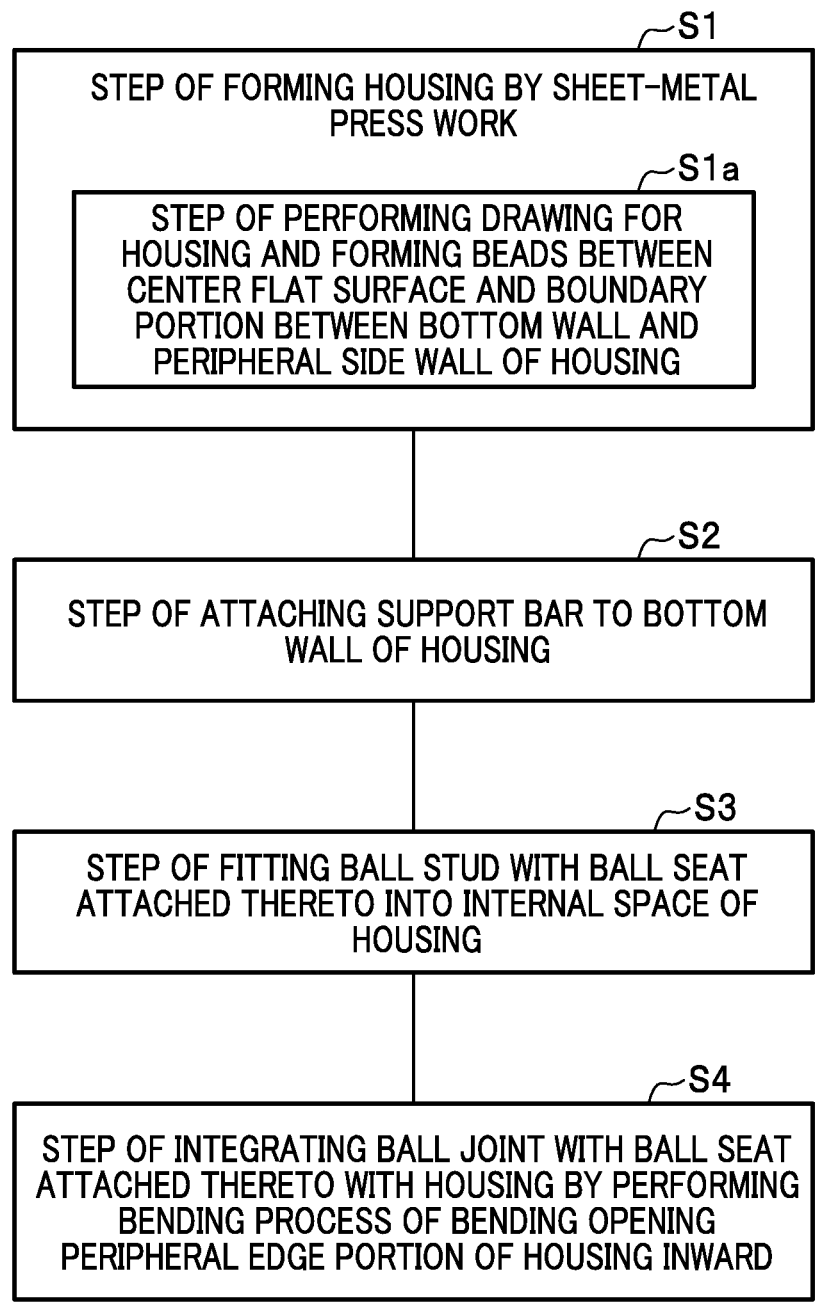
FIG. 5 is a process flowchart showing a method for manufacturing a ball joint according to the embodiment of the present invention.

FIG. 5 is a process flowchart showing a method for manufacturing a ball joint according to the embodiment of the present invention.

The method for manufacturing the ball joint 15 according to the embodiment of the present invention is, as illustrated in FIG. 2, based on the method for manufacturing the axial ball joint 15 which includes the ball stud 41 having the stud portion 41a and the ball portion 41b, the metallic housing 43 that rotatably supports the ball portion 41b of the ball stud 41, and the resin ball seat 45 interposed between the ball portion 41b and the housing 43.

As shown in FIG. 5, the method for manufacturing the axial ball joint 15 includes the following manufacturing steps in chronological order (see FIG. 2): a step of forming the housing 43 by press work (step S1), a step of attaching the support bar 14 to the bottom wall 43a of the housing 43 (step S2), a step of fitting the ball stud 41 with the ball seat 45 attached thereto into the internal space of the housing 43 (step S3), and a step of integrating the ball stud 41 with the ball seat 45 attached thereto with the housing 43 by performing a bending process of bending the opening peripheral edge portion 43c of the housing 43 inward to hold the stop ring 47 (step S4).

The step of forming the housing 43 by press work in step S1 includes a step (step S1a) of performing drawing for the housing 43 and forming beads extending from the boundary portion 52 between the bottom wall 43a and the peripheral side wall 43b of the housing 43 to the center flat surface 43i.

In the method for manufacturing the axial ball joint 15, the step of forming the housing 43 by press work (step S1) includes a step (step S1a) of performing drawing for the housing 43 and performing bead forming to form the bead portions 53 in the bottom wall 43a of the housing 43. This configuration makes it possible to expand the degree of freedom in selection of the manufacturing process of the housing 43, contribute to weight saving, and simplify the manufacturing process.

<Operational Advantage Provided by Ball Joint 15 According to Embodiment of Present Invention>

Next, the operational advantage provided by the ball joint according to the embodiment of the present invention will be described by taking the axial ball joint 15 as an example of a ball joint.

A ball joint 15 according to a first aspect of the present invention, as illustrated in FIG. 2, is based on a axial ball joint 15 which includes a ball stud 41 including a stud portion 41a and a ball portion 41b, a metal housing 43 that rotatably supports the ball portion 41b of the ball stud 41, and a resin ball seat 45 interposed between the ball portion 41b and the housing 43.

The housing 43 has a bottomed cylindrical shape formed by press work or forging. The housing 43 has a bottom wall 43a and a peripheral side wall 43b having a substantially equal thickness. The housing 43 has an inner bottom 43g having a plurality of bead portions 53 formed by press work or forging.

For the ball joint 15 according to the first aspect of the present invention, the bead portions 53 are formed in the inner bottom 43g of the housing 43, as illustrated in FIG. 3A, in the course of forming the housing 43 into a bottomed cylindrical shape by press work or forging. This configuration makes it possible to provide a housing 43 having an enough stiffness at the bottom wall 45a of the housing 43, easy to be processed and produced, and less easy to deform. This also makes it possible to expand the degree of freedom in selection of the manufacturing process of the housing 43, contribute to weight saving and reduction of the thickness, and achieve cost down by simplifying the manufacturing process. Thus, forming the bead portions 53 in the bottom wall 43a makes it possible to reduce the thickness (t1) of the housing 43, which is conventionally 3.6 mm, to 2.6 mm.

A ball joint 15 according to a second aspect of the present invention is the ball joint 15 according to the first aspect of the present invention in which the ball seat 45 has housing recesses 55 for housing the bead portions 53 at portions corresponding to the bead portions 53, as illustrated in FIGS. 2 and 4A.

For the ball joint 15 according to the second aspect of the present invention, since the ball seat 45 has the housing recesses 55 for housing the bead portions 53 at the portions corresponding to the bead portions 53, it possible to fit the bead portions 53 into the housing recesses 55. This makes it possible to obviate a positional error of the ball seat 45 relative to the housing 43 in the circumferential direction. This also prevents the ball seat 45 and the housing 43 from rotating relative to each other.

A ball joint 15 according to a third aspect of the present invention is the ball joint 15 according to the first aspect of the present invention, in which the housing 43 has an outer bottom 43h having recessed grooves 51 at portions respectively corresponding to the bead portions 53, as illustrated in FIGS. 3A and 3B.

For the ball joint according to the third aspect of the present invention, since the bead portions 53 conform to the recessed grooves 51 in the outer bottom 43h of the housing 43, the bead portions 53 and the recessed grooves 51 increase the strength of the bottom wall 43a of the housing 43 against deformation.

A ball joint 15 according to a fourth aspect of the present invention is the ball joint 15 according to the first aspect of the present invention, in which the housing 43 has an outer bottom 43h having a support-bar joint surface 43k at a center portion of the outer bottom 43h, the support-bar joint surface 43k being recessed from the outer bottom 43h and configured to be joined to a support bar 14 (see FIG. 3E), as illustrated in FIGS. 2 and 3B.

For the ball joint 15 according to the fourth aspect of the present invention, since the outer bottom 43h of the housing 43 has the support-bar joint surface 43k formed to be recessed, the support-bar joint surface 43k serves as a guide that makes it easy to center the housing 43 relative to a jig (not shown) when the support bar 14 is joined to the housing 43 using the jig (not shown). Thus, it is easy to join the support bar 14 to a specified portion of the housing 43.

A ball joint 15 according to a fifth aspect of the present invention is the ball joint 15 according to the first aspect of the present invention, in which the inner bottom 43g of the housing 43 has a center flat surface 43i formed at a center portion of the inner bottom 43g and tapered portions 43j each formed at an end on the center flat surface 43i side of each bead portion 53, as illustrated in FIGS. 3A and 3C.

For the ball joint 15 according to the fifth aspect of the present invention, when the ball seat 45 illustrated in FIG. 2 is attached to the inner bottom 43g of the housing 43, the center flat surface 43i and the tapered portions 43j of the inner bottom 43g guide the ball seat 45. Thus, it is easy to attach the ball seat 45 into the inner bottom 43g.

A ball joint 15 according to a sixth aspect of the present invention is the ball joint 15 according to the first aspect of the present invention, in which the number of the bead portions 53 is three or more and less than 13, and the bead portions 53 are arranged circumferentially at equal intervals, as illustrated in FIG. 3A.

For the ball joint 15 according to the sixth aspect of the present invention, since the inner bottom 43g of the housing 43 has three or more and less than 13 bead portions 53, the bottom wall 43a of the housing 43 has a high deformation strength.

A ball joint 15 according to a seventh aspect of the present invention is the ball joint 15 according to the fifth aspect of the present invention, in which the bead portions 53 extend radially from the center flat surface 43i toward outer periphery portions of the inner bottom 43g of the housing 43, as illustrated in FIG. 3A.

For the ball joint 15 according to the seventh aspect of the present invention, since the inner bottom 43g of the housing 43 has the bead portions 53 extending radially from the center flat surface 43i toward outer periphery portions, the bottom wall 43a of the housing 43 has a high deformation strength.

A ball joint 15 according to an eighth aspect of the present invention is the ball joint 15 according to the seventh aspect of the present invention, in which each of the bead portions 53 has an arc shape in longitudinal-sectional view, as illustrated in FIG. 3E.

For the ball joint 15 according to the eighth aspect of the present invention, the bead portion 53 is formed in an arc shape in longitudinal-sectional view as illustrated in FIG. 3F, and this shape makes it easy to engage the bead portions 53 with the housing recess 55 of the ball seat 45 (see FIG. 2). Since the bead portion 53 has an arc shape in longitudinal-sectional view, the ridge line of the bead portion 53 is formed in the inner bottom 43g, and this configuration increases the stiffness of the bottom wall 43a and in turn increases the deformation strength.

A ball joint 15 according to a ninth aspect of the present invention is a stabilizer link 11 for connecting a suspension device 17 and a stabilizer 18 included in a vehicle 10 as illustrated in FIG. 1, the stabilizer link 11 including: a pair of connecting portions; and a support bar (see FIG. 2) coupling the pair of connecting portions, and at least one of the pair of connecting portions in the stabilizer link 11 includes the ball joint 13, 15 (see FIG. 2) according to any one of the first to seventh aspects of the present inventions.

The stabilizer link 11 according to the ninth aspect of the present invention makes it possible to expand the degree of freedom in selection of the manufacturing process of the housing 43 illustrated in FIG. 2, contribute to weight saving, and simplify the manufacturing process.

A method for manufacturing a ball joint 15 according to a tenth aspect of the present invention is, as illustrated in FIGS. 2 and 5, based on a method for manufacturing an axial ball joint 15 including a ball stud 21 including a stud portion 21a and a ball portion 21b, a metal housing 43 that rotatably supports the ball portion 21b of the ball stud 21, and a resin ball seat 45 interposed between the ball portion 21b and the housing 43.

The method for manufacturing the ball joint 15 includes the following manufacturing steps in chronological order: a step of forming the housing 43 by press work or forging (step S1), a step of attaching a support bar 14 to a bottom wall 43a of the housing 43 (step S2), a step of fitting the ball stud 21 with the ball seat 45 attached thereto into an internal space of the housing 43 (step S3), and a step of integrating the ball stud 21 with the ball seat 45 attached thereto with the housing 43 by performing a bending process of bending an opening peripheral edge portion 23c of the housing 43 inward (step S4).

The step (step S1) of forming the housing 43 by press work or forging includes a step of performing drawing for the housing 43 and forming a bead portion 53 in the bottom wall 43a of the housing 43.

For the method for manufacturing the ball joint 15 according to the tenth aspect of the present invention, since the step of forming the housing 43 by press work or forging includes the step of performing drawing for the housing 43 and forming the bead portion 53 in the bottom wall 43a of the housing 43, it is possible to expand the degree of freedom in selection of the manufacturing process of the housing 43, contribute to weight saving, and simplify the manufacturing process.

First Modification

The present invention is not limited to the above embodiment, but various kinds of modifications and changes are possible within the scope of the technical idea thereof. Such modifications and changes are naturally included in the scope of the present invention. The constituents already described are denoted by the same symbols, and description thereof is omitted.

Figure 6A:
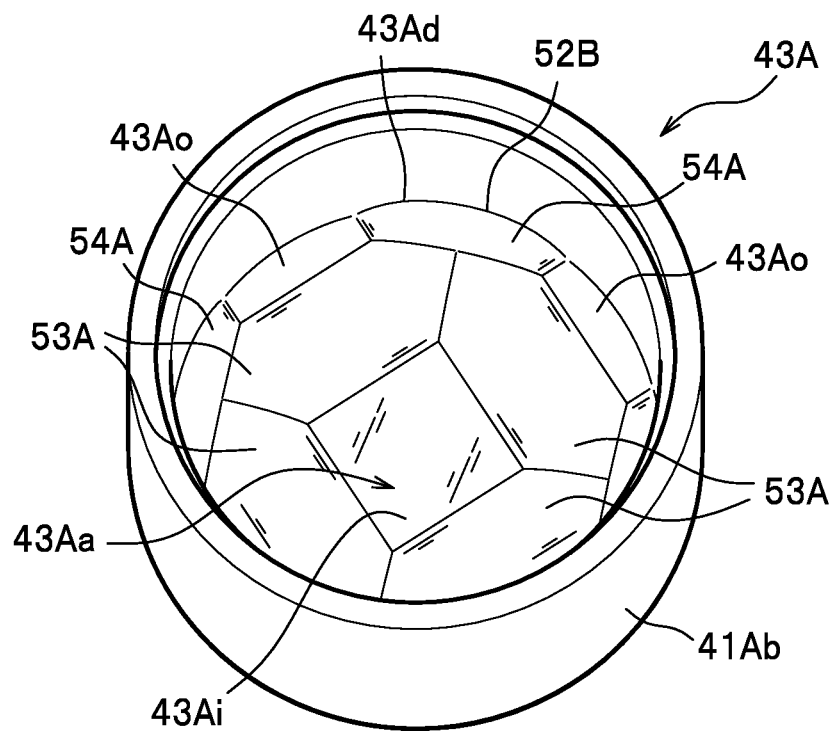
FIG. 6A is a perspective view of the internal space of a housing serving as a constituent member of a ball joint according to a first modification of the embodiment of the present invention, which is viewed through an opening of the housing.
Figure 6B:
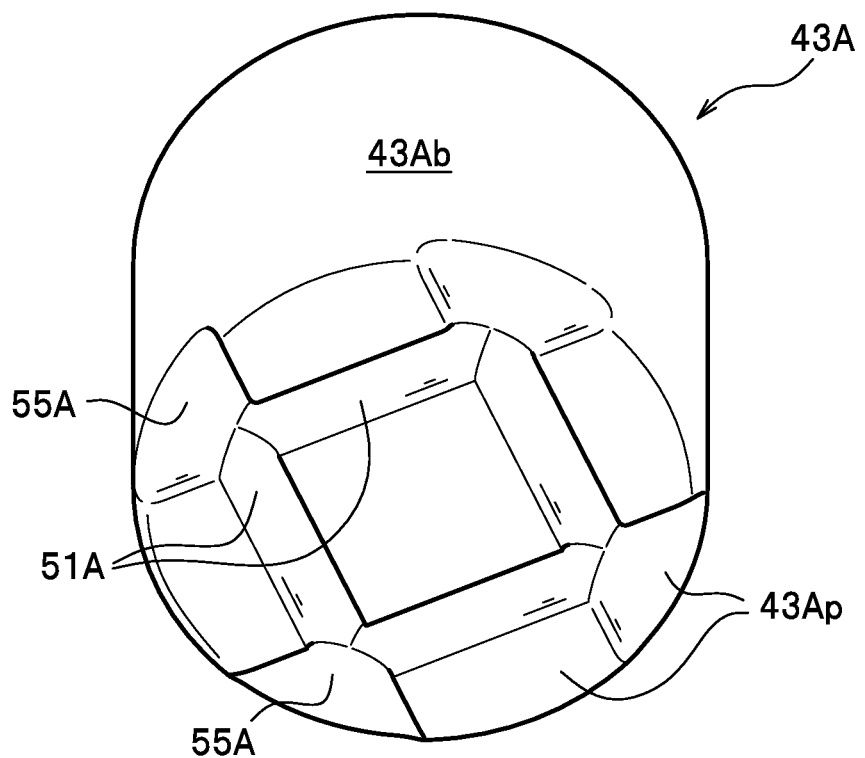
FIG. 6B is a perspective view of the outer appearance of the housing serving as a constituent member of the ball joint according to the first modification of the embodiment of the present invention, which is viewed obliquely from the bottom side.

The following describes a metal housing 43A serving as a constituent member of a ball joint 15 according to a first modification of the embodiment of the present invention with reference to FIGS. 6A to 6C.

FIG. 6A is a perspective view of the internal space of the housing serving as a constituent member of the ball joint according to the first modification of the embodiment of the present invention, which is viewed through the opening of the housing. FIG. 6B is a perspective view of the outer appearance of the housing serving as a constituent member of the ball joint according to the first modification of the embodiment of the present invention, which is viewed obliquely from the bottom side. FIG. 6C is a cross-sectional perspective view of the internal space of the housing serving as a constituent member of the ball joint according to the first modification of the embodiment of the present invention, which is viewed through the opening of the housing.

As shown in FIG. 6A, the housing 43A serving as a constituent member of the axial ball joint 15 according to the first modification of the embodiment of the present invention has a bottomed cylindrical shape including a substantially disc-shaped bottom wall 43Aa and a cylindrical peripheral side wall 43Ab which continues from the bottom wall 43Aa.

As illustrated in FIGS. 6A and 6C, the inner bottom 43Ag of the housing 43A has a center flat surface 43Ai in its center portion, the center flat surface 43Ai being configured to be engaged with a quadrangle protrusion (not shown) formed in a center portion of the lower surface of a ball seat (not shown) according to the first modification. The center flat surface 43Ai has a quadrangular shape in plan view, and around the center flat surface 43Ai are formed bead portions 53A in a hash shape that surround the center flat surface 43Ai, each bead portion 53A having an arc shape in longitudinal-sectional view.

From each of the four outer corners of the hash-shaped bead portions 53A to the inner-bottom corner portion 43Ad positioned at the boundary portion 52A between the bottom wall 43Aa and the peripheral side wall 43Ab of the housing 43A is formed a second bead portion 54A protruding in an approximately sector shape in plan view. Outside the four sides of the hash-shaped bead portions 53A, an outer flat surface 43Ao is formed between the outside of each of the four sides and the inner peripheral edge of the inner bottom 43Ag.

The housing 43A of the axial ball joint 15 according to the first modification, as in the above embodiment, has a bottomed cylindrical shape formed by sheet-metal press work including drawing and bead forming or by forging. Hence, in the bottom wall 43Aa of the housing 43A, the back sides of the bead portions 53A, as illustrated in FIGS. 6B and 6C, have recessed grooves 51A recessed from the outer bottom 43Ah side to the inner bottom 43Ag side of the housing 43A to conform to the shape of the hash-shaped bead portions 53A.

On the back sides of the second bead portions 54A are formed four recesses 55A each recessed from the outer bottom 43Ah side to the inner bottom 43Ag side to conform to the shape of the second bead portion 54A having a sector shape in plan view. On the back sides of the outer flat surfaces 43Ao are formed flat surfaces 43Ap between the outside of each of the four sides of the hash-shaped bead portions 53A and the inner-bottom corner portion 43Ad, each flat surface 43Ap conforming to the shape of the outer flat surface 43Ao.

For example, assume that a load is inputted to the bottom wall 43Aa of the housing 43A in the axial ball joint 15 according to the first modification through the support bar 14. The load inputted to the bottom wall 43Aa of the housing 43A is transmitted to the peripheral side wall 43Ab of the housing 43A. Here, the bottom wall 43Aa of the housing 43A has the hash-shaped bead portions 53A and the second bead portions 54A formed by sheet-metal press work including drawing and rib forming or by forging performed in the manufacturing process of the housing 43A. Thus, the deformation strength of the bottom wall 43Aa is significantly higher than the configuration without bead forming.

Thus, for the axial ball joint 15 according to the first modification, in the case where a load is inputted to the bottom wall 43Aa of the housing 43A through the support bar 14, and even if the load is large, the axial ball joint 15 can properly transmit the load to the peripheral side wall 43Ab of the housing 43A without causing a deformation related to the bottom wall 43Aa.

Thus, for the axial ball joint 15 according to the first modification, the housing 43A has a bottomed cylindrical shape formed by sheet-metal press work including drawing and bead forming or by forging and also has the bead portions 53A and the second bead portions 54A in the bottom wall 43Aa of the housing 43A. This configuration makes it possible to expand the degree of freedom in selection of the manufacturing process of the housing 43A, contribute to weight saving, and simplify the manufacturing process.

Although the first modification has been described based on an example in which the housing 43A has the quadrangular (hash-shaped) bead portions 53A and the second bead portions 54A at four places of the outer periphery portions of the bead portion 53A, the shape of the bead portions is not limited to any specific ones. For example, the bead portions 53A may have a polygonal shape in plan view, such as a triangle, a pentagon, or a hexagon. In this case, the second bead portions 54A may be formed between the outer corners of the polygonal bead portions 53A and the inner-bottom corner portion 43Ad.

Second Modification

Figure 7B:
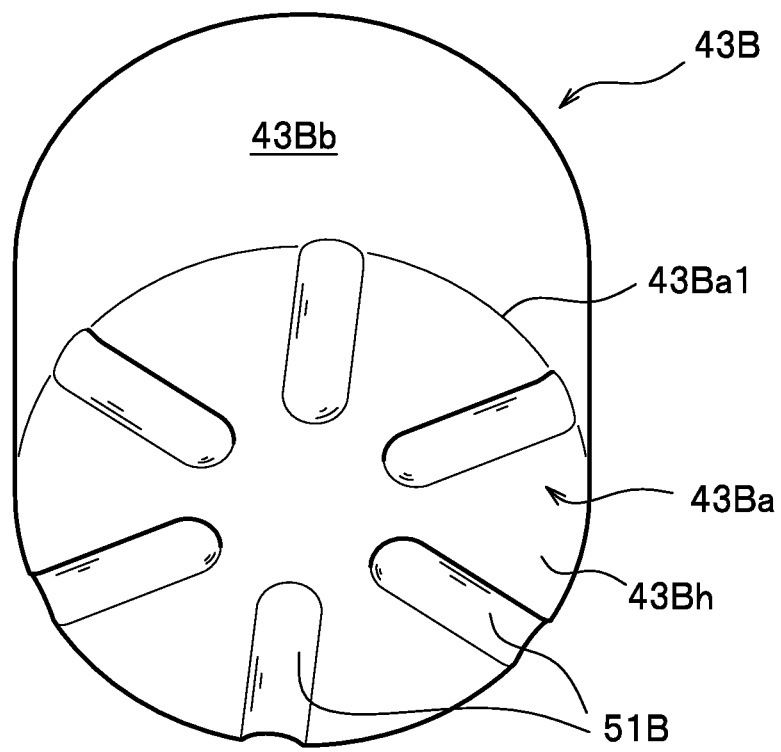
FIG. 7B is a perspective view of the outer appearance of the housing serving as a constituent member of the ball joint according to the second modification of the embodiment of the present invention, which is viewed obliquely from the bottom side.
Figure 7C:
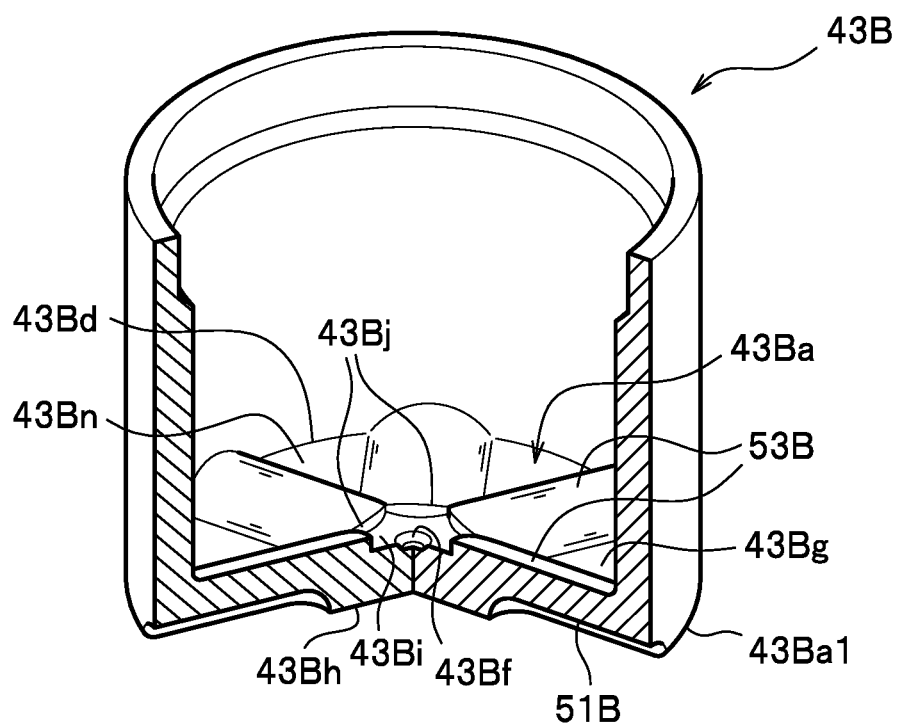
FIG. 7C is a cross-sectional perspective view of the internal space of the housing serving as a constituent member of the ball joint according to the second modification of the embodiment of the present invention, which is viewed through the opening of the housing.

Next described is a metal housing 43B serving as a constituent member of a ball joint 15 according to a second modification of the embodiment of the present invention with reference to FIGS. 7A to 7C.

FIG. 7A is a perspective view of the internal space of the housing serving as a constituent member of the ball joint according to the second modification of the embodiment of the present invention, which is viewed through the opening of the housing. FIG. 7B is a perspective view of the outer appearance of the housing serving as a constituent member of the ball joint according to the second modification of the embodiment of the present invention, which is viewed obliquely from the bottom side. FIG. 7C is a cross-sectional perspective view of the internal space of the housing serving as a constituent member of the ball joint according to the second modification of the embodiment of the present invention, which is viewed through the opening of the housing.

As shown in FIG. 7A, the housing 43B serving as a constituent member of the axial ball joint 15 according to the second modification of the embodiment of the present invention has a bottomed cylindrical shape including a substantially disc-shaped bottom wall 43Ba and a cylindrical peripheral side wall 43Bb which continues from the bottom wall 43Ba.

As illustrated in FIG. 7A, the bottom wall 43Ba of the housing 43B has a housing recess 43Bf at its inner central portion, the housing recess 43Bf being configured to house a substantially columnar projection (not shown) provided on a ball seat according to the second modification (not shown). The housing 43B has a substantially hexagonal center flat surface 43Bi around the housing recess 43Bf.

As illustrated in FIGS. 7A and 7C, the inner bottom 43Bg of the housing 43B has a plurality of bead portions 53B to increase the deformation strength related to the bottom wall 43Ba. The number of the bead portions 53B is six, and the bead portions 53B are formed radially in plan view and extend from each side of the substantially hexagonal center flat surface 43Bi toward the inner-bottom corner portion 43Bd. Between adjacent ones of the bead portions 53B are formed sector-shaped inner bottom surfaces 43Bn in the circumferential direction, each sector-shaped inner bottom surface 43Bn having a substantially sector shape (substantially triangular shape) in plan view. Each of the bead portions 53B is formed to be raised in an arc shape in longitudinal-sectional view. At the end on the center flat surface 43Bi side of each bead portion 53B is formed a tapered surface 43Bj.

The housing 43B of the axial ball joint 15 according to the second modification, as in the above embodiment, has a bottomed cylindrical shape formed by sheet-metal press work including drawing and rib forming or by forging. Hence, in the bottom wall 43Ba of the housing 43B, the outer bottom 43Bh sides of the bead portions 53B have, as illustrated in FIGS. 7B and 7C, recessed grooves 51B each recessed from the outside to the inside of the housing 43B to conform to the shape of the bead portion 53B.

As illustrated in FIG. 7B, the six recessed grooves 51B respectively corresponding to the six bead portions 53B are positioned at specified intervals in the circumferential direction of the outer peripheral edge portion 43Ba1 of the outer bottom 43Bh. Each of the six recessed grooves 51B, as illustrated in FIG. 7B, is an elongated groove having an arc shape in cross-sectional view. The bead portions 53B and the recessed grooves 51B cooperate to play roles to increase the deformation strength related to the bottom wall 43Ba of the housing 43B.

Third Modification

Figure 8A:
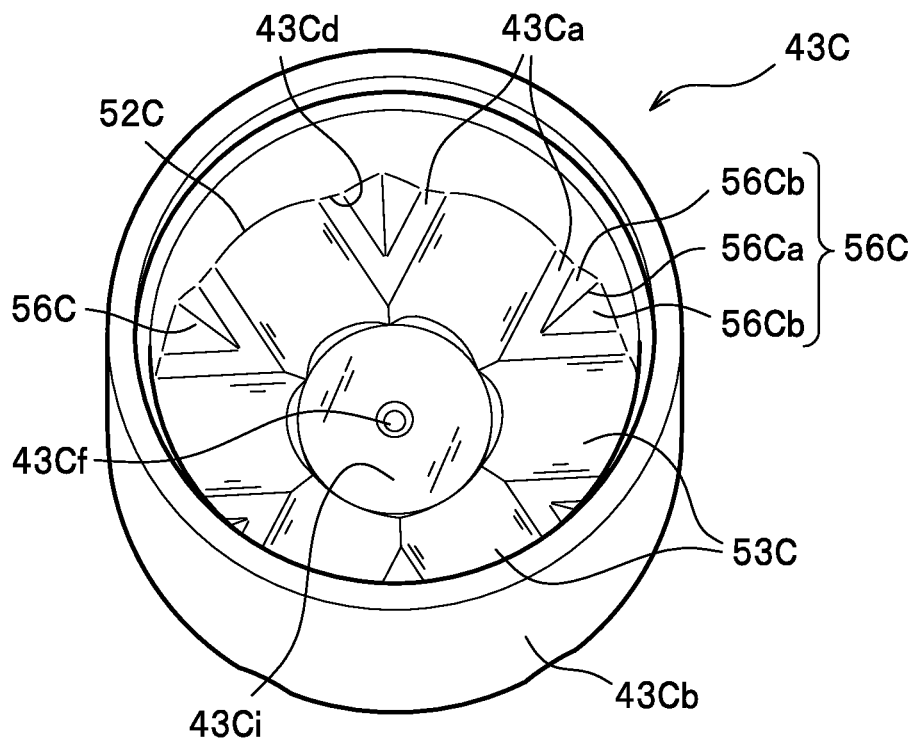
FIG. 8A is a perspective view of the internal space of a housing serving as a constituent member of a ball joint according to a third modification of the embodiment of the present invention, which is viewed through the opening of the housing.
Figure 8B:
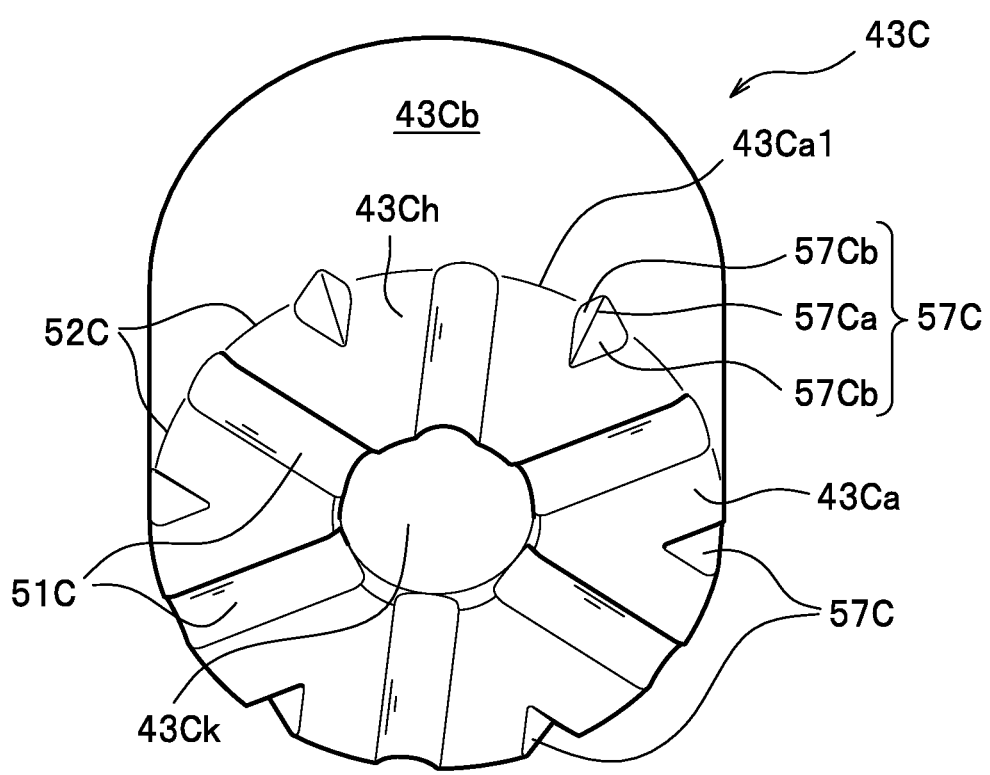
FIG. 8B is a perspective view of the outer appearance of the housing serving as a constituent member of the ball joint according to the third modification of the embodiment of the present invention, which is viewed obliquely from the bottom side.

FIG. 8A is a perspective view of the internal space of a housing serving as a constituent member of a ball joint according to a third modification of the embodiment of the present invention, which is viewed through the opening of the housing. FIG. 8B is a perspective view of the outer appearance of the housing serving as a constituent member of the ball joint according to the third modification of the embodiment of the present invention, which is viewed obliquely from the bottom side.

As illustrated in FIGS. 8A and 8B, the housing 43C may have rib portions 56C at the boundary portion 52C between the bottom wall 43Ca and the peripheral side wall 43Cb of the housing 43C, each rib portion 56C being formed between each pair of adjacent ones of the bead portions 53C to protrude from the outside to the inside of the housing 43C.

Thus, the rib portions 56C formed at the boundary portion 52C between the bottom wall 43Ca and the peripheral side wall 43Cb further increases the stiffness of the housing 43C, making it less easy for the housing 43C to be deformed.

In this case, each of the rib portions 56C is formed, as illustrated in FIG. 8A, to protrude in a brace shape from the outside to the inside of the housing 43C between adjacent ones of the bead portions 53C at the inner-bottom corner portion 43Cd positioned at the boundary portion 52C between the bottom wall 43Ca and the peripheral side wall 43Cb of the housing 43C. A recess 57C is formed between adjacent ones of the recessed grooves 51C at the outer peripheral edge portion 43C1 of the outer bottom 43Ch. More specifically, each of the rib portions 56C has a triangular pyramid shape having a pair of substantially triangular inclined portions 56Cb with the ridge line 56Ca in between.

As shown in FIG. 8A, the ridge line 56Ca of each rib portion 56C is inclined and extends straight across the boundary portion 52C between the bottom wall 43Ca and the peripheral side wall 43Cb in a brace shape. Here, the inclination angle of the ridge line 56Ca of each rib portion 56C is set to an appropriate angle within an angular range from 15° to 75°. Note that it is most preferable that the inclination angle of the ridge line 56Ca be 45° to increase the deformation strength related to the boundary portion 52C.

In a transverse plane crossing the ridge line 56Ca of the rib portion 56C, the ridge angle formed by the pair of inclined portions 56Cb, 56Cb with the ridge line 56Ca in between is set to an appropriate angle within an angular range from 60° to 90°. It is preferable that the ridge angle be 60° to increase the deformation strength related to the boundary portion 52C.

The housing 43C of the axial ball joint 15, as described above, is formed in a bottomed cylindrical shape by sheet-metal press work including drawing and rib forming. Hence, in the bottom wall 43Ca of the housing 43C, the back sides of the rib portions 56C have, as illustrated in FIG. 8B, the recessed grooves 51C each recessed from the outside to the inside of the housing 43C to conform to the shape of the rib portion 56C.

As illustrated in FIG. 8B, the recessed grooves 51C respectively corresponding to the rib portions 56C are positioned at specified intervals in the circumferential direction of the outer peripheral edge portion 43Ca1 of the bottom wall 43Ca. In the example of FIG. 8B, the housing 43C has six recessed grooves 51C and six recesses 57C formed alternately in the circumferential direction at the outer peripheral edge portion 43Ca1 of the bottom wall 43Ca.

Each recess 57C has, as illustrated in FIG. 8B, a pair of substantially triangular inclined portions 57Cb, 57Cb with a trough line 57Ca in between. The rib portions 56C (see FIG. 8A) and the recesses 57C cooperate to play roles to increase the deformation strength related to the boundary portion 52C of the housing 43C. The recess 57C is formed between each pair of adjacent ones of the recessed grooves 51C at the outer peripheral edge portion 43C1 of the outer bottom 43Ch.

Other Modifications

For instance, in the description of the embodiment according to the present invention (see paragraph 0048), an example has been described as illustrated in FIGS. 4A to 4C in which the small diameter peripheral side wall 45g is provided below the peripheral side wall 45b of the ball seat 45 with the looped step portion 45f in between. However, the present invention is not limited to this example.

The small diameter peripheral side wall 45g is provided for the purpose of obviating the situation in which the outer peripheral edge portion 45a1 of the bottom wall 45a of the ball seat 45 touches and interferes with the inner-bottom corner portion 43d of the housing 43 when the ball seat 45 is housed in the internal space of the housing 43.

In light of the above purpose, any configurations may be employed that make it possible to obviate the situation in which the outer peripheral edge portion 45a1 of the bottom wall 45a of the ball seat 45 touches and interferes with the inner-bottom corner portion 43d of the housing 43 (examples of such configurations include one having a tapered portion below the peripheral side wall 45b of the ball seat 45, the diameter of the tapered portion gradually decreasing toward the bottom wall 45a of the ball seat 45).

The shape, the number, and the like of the bead portions 53, 53A, 53B, 53C and the recessed grooves 51, 51A, 51B, 51C may be changed as appropriate. The bead portions 53 and 53A to 53C and the recessed grooves 51 and 51A to 51C may be elongated grooves having a trapezoidal or triangular shape in longitudinal-sectional view.

The bead portions 53 and 53A to 53C and the recessed grooves 51 and 51A to 51C may have dot shapes (dot pattern shapes) formed between the bottom wall 43a, 43Aa to 43Ca and the center flat surface 43i, 43Ai, 43Bi and the support-bar joint surface 43k of the bottom wall 43a, 43Aa, 43Ba, 43Ca.

Although the embodiment has been described based on an example in which the bead portions 53 and the recessed grooves 51 are formed to have a constant height from the outer periphery toward the center of the bottom wall 43a, the present disclosure is not limited to this example. For example, the bead portions 53 and the recessed grooves 51 may have an ascending slope at an angle up to 15 degrees from the outer periphery toward the center of the bottom wall 43*a*.

REFERENCE SIGNS LIST

10 vehicle
11 stabilizer link
12 support bar
13 radial ball joint (ball joint)
14 support bar
15 axial ball joint (ball joint)
17 suspension device
18 stabilizer
21 ball stud
21*a* stud portion
21*b* ball portion
23*c* opening peripheral edge portion
41 ball stud
41*a* stud portion
41*b* ball portion
43, 43A, 43B, 43C housing
43*a*, 43A*a*, 43B*a*, 43C*a* bottom wall of housing
43*b*, 43A*b*, 43B*b*, 43C*b* peripheral side wall of housing
43*g*, 43A*g* inner bottom of housing
43*h* outer bottom of housing
43*i*, 43A*i*, 43AB*i*, 43C*i* center flat surface of housing
43*j* tapered portion of housing
43*k* support-bar joint surface
45 ball seat
51, 51A, 51B, 51C recessed groove
52, 52A, 52B, 52C boundary portion between bottom wall and peripheral side wall of housing
53, 53A, 53B, 53C bead portion
56C rib portion

The invention claimed is:

1. A ball joint, comprising:
a ball stud including a stud portion and a ball portion;
a metal housing that rotatably supports the ball portion of the ball stud; and
a resin ball seat interposed between the ball portion and the housing,
the housing has a bottomed cylindrical shape formed by press work or forging,
the housing has a bottom wall and a peripheral side wall having a substantially equal thickness, and
the housing has an inner bottom having a plurality of circumferentially arranged bead portions formed by press work or forging,
the ball seat having a plurality of housing recesses at a closed bottom thereof for housing the plurality of bead portions, the housing recesses formed at locations corresponding to, and sized and shaped to engage with, the plurality of bead portions, and
the housing having an outer bottom having a plurality of recessed grooves at portions respectively corresponding to the plurality of bead portions.

2. The ball joint according to claim 1, wherein the outer bottom has a support-bar joint surface at a center portion of the outer bottom, the support-bar joint surface being recessed from the outer bottom and configured to be joined to a support bar.

3. The ball joint according to claim 1, wherein the inner bottom of the housing has-a center flat surface formed at a center portion of the inner bottom and-tapered portions each formed at an end on the center flat surface side of each bead portion.

4. The ball joint according to claim 3, wherein the bead portions extend radially from the center flat surface toward outer periphery portions of the inner bottom of the housing.

5. The ball joint according to claim 4, wherein each of the bead portions has an arc shape in longitudinal-sectional view.

6. The ball joint according to claim 1, wherein the number of the bead portions is three or more and less than 13, and the bead portions are arranged circumferentially at equal intervals.

7. The ball joint according to claim 1, wherein the housing has rib portions at a boundary portion between the bottom wall and the peripheral side wall, each rib portion being positioned between each pair of adjacent bead portions of the bead portions and protruding from the outside to the inside of the housing.

8. A stabilizer link for connecting a suspension device and a stabilizer included in a vehicle, wherein the stabilizer link comprises:
a pair of connecting portions; and
a support bar coupling the pair of connecting portions, and
at least one of the pair of connecting portions in the stabilizer link includes the ball joint according to claim 1.

9. A method for manufacturing a ball joint according to claim 1 wherein the method comprises:
forming the housing by press work or forging;
attaching a support bar to the bottom wall of the housing;
fitting the ball stud with the ball seat attached thereto into an internal space of the housing; and
integrating the ball stud with the ball seat attached thereto with the housing by performing a bending process of bending an opening peripheral edge portion of the housing inward, and
the forming the housing by press work or forging includes performing drawing for the housing and forming a bead portion in the bottom wall of the housing.

* * * * *